US012150395B1

(12) United States Patent
Keigley et al.

(10) Patent No.: US 12,150,395 B1
(45) Date of Patent: Nov. 26, 2024

(54) TOWABLE TOOLS INCLUDING PASSIVELY ROTATING GROUND-WORKING DISCS

(71) Applicant: ABI ATTACHMENTS INC., Mishawaka, IN (US)

(72) Inventors: Kevin V. Keigley, Osceola, IN (US); Nathaniel Lee Smith, Goshen, IN (US); Justin M. Graber, Mishawaka, IN (US)

(73) Assignee: ABI ATTACHMENTS, INC., Mishawaka, IN (US)

( * ) Notice: Subject to any disclaimer, the term of this patent is extended or adjusted under 35 U.S.C. 154(b) by 705 days.

(21) Appl. No.: 17/231,102

(22) Filed: Apr. 15, 2021

(51) Int. Cl.
*A01B 21/08* (2006.01)
*A01B 23/06* (2006.01)

(52) U.S. Cl.
CPC ............ *A01B 21/086* (2013.01); *A01B 23/06* (2013.01)

(58) Field of Classification Search
CPC ....... A01B 21/086; A01B 21/08; A01B 23/06; A01B 23/00; A01B 5/00; A01B 5/02; A01B 5/04; A01B 7/00; A01B 15/16
See application file for complete search history.

(56) References Cited

U.S. PATENT DOCUMENTS

| | | | | |
|---|---|---|---|---|
| 2,588,709 A | * | 3/1952 | Hubert ................. | A01B 21/086 172/578 |
| 2,798,419 A | * | 7/1957 | Moriceau ............... | A01B 21/08 172/600 |
| 2,882,981 A | | 4/1959 | Christensen | |
| 4,538,689 A | * | 9/1985 | Dietrich, Sr. ......... | A01B 49/02 172/700 |
| 4,928,774 A | * | 5/1990 | Bell ..................... | A01B 21/086 172/603 |
| 7,048,069 B1 | * | 5/2006 | Bollich ................ | A01B 21/086 172/147 |
| 9,398,738 B2 | | 7/2016 | Achten | |
| 10,765,052 B2 | | 9/2020 | DeGarmo | |
| 2019/0380251 A1 | * | 12/2019 | Becker ................ | A01B 63/002 |
| 2021/0007266 A1 | | 1/2021 | Stoller et al. | |

FOREIGN PATENT DOCUMENTS

| | | |
|---|---|---|
| DE | 202004020159 | 4/2005 |
| EP | 0891691 | 1/1999 |
| EP | 3636059 | 4/2020 |
| KR | 101740377 | 5/2017 |

OTHER PUBLICATIONS

Northern Tool & Equipment, "King Kutter Tow Behind Garden Tractor/ATV Compact Disc—33in Working Wiedth, Model #14-10-DC-YK", also available at https://www.northerntool.com/shopt/tools/product_200311181_200311181, Feb. 15, 2021, 2 pgs.

* cited by examiner

*Primary Examiner* — Jamie L McGowan
*Assistant Examiner* — Audrey L Lusk
(74) *Attorney, Agent, or Firm* — Taft Stettinius & Hollister LLP

(57) ABSTRACT

A towable tool includes a frame extending over a width in an X-axis direction, a length in a Y-axis direction, and a height in a z-axis direction. A plurality of ground-contacting support wheels are rotatably coupled with the frame. A plurality of ground-working discs each rotatably coupled with a respective rigid shank. Each rigid shank is received and selectably retained in a respective receptacle of the frame.

19 Claims, 21 Drawing Sheets

TOWABLE TOOLS INCLUDING PASSIVELY ROTATING GROUND-WORKING DISCS

BACKGROUND

The present application relates to towable tools including passively rotating ground-working discs. Multiple tools have been proposed for cultivating or tilling soil and other ground surfaces including a number of tools having rotatable ground-working discs which include and are sometimes referred to as disc harrows, disc cultivators, or disc tillers. Some conventional approaches to such tools have utilized actively driven discs to work the ground surface while others have relied on passively rotating discs. Conventional approaches generally seek to maximize the number, density, and working area coverage of their ground-working discs subject to maximum operational or design limits. For example, some conventional approaches favor multiple rows or gangs each including multiple discs which may be offset or overlapping laterally relative to a working direction in whole or in part. Conventional approaches have understandably sought to provide adjustable and/or deflectable discs to accommodate resistance encountered by the ground being worked and obstacles or spoils thereof. Conventional approaches have also understandably sought to maximize the lateral disc density, for example, by spacing adjacent discs apart by a distance equal to or less than the radius of discs or otherwise minimizing the lateral disc spacing. Conventional approaches have proven useful when used in connection with some work machines and applications; however, they continue to suffer from a number of drawbacks, disadvantages, and limitations. Overcoming such difficulties has been particularly challenging for light towable or tow-behind tools (e.g., with tools with a mass of about 450 kg or less) including passively rotating discs ultra-light towable or tow-behind tools (e.g., with tools with a mass of about 300 kg or less) including passively rotating discs. In the context of such tools, the ability to simply add mass to increase downforce is constrained by towing capabilities of the tools. Even where towing capabilities permit mass increase, the fuel or economy or energy penalty and attendant increase in the cost of ownership or operation imposes limiting pressure on the mass increase as do practical requirements such as off-tow mobility and storage needs. Similar limitations are imposed and apply to the forward operating resistance of drag which is correlated with the number of the positioning of passively rotating discs. There remain significant unmet needs for the unique apparatuses, methods, systems, and techniques disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art.

SUMMARY OF THE DISCLOSURE

Some embodiments comprise unique apparatuses including towable tools including passively rotating ground-working discs. Some embodiments comprise unique systems including towable tools including passively rotating ground-working discs. Some embodiments comprise unique methods or techniques utilizing towable tools including passively rotating ground-working discs. Further embodiments, forms, objects, features, advantages, aspects, and benefits shall become apparent from the following description and drawings.

DETAILED DESCRIPTION OF EXAMPLE EMBODIMENTS

Figure 1:
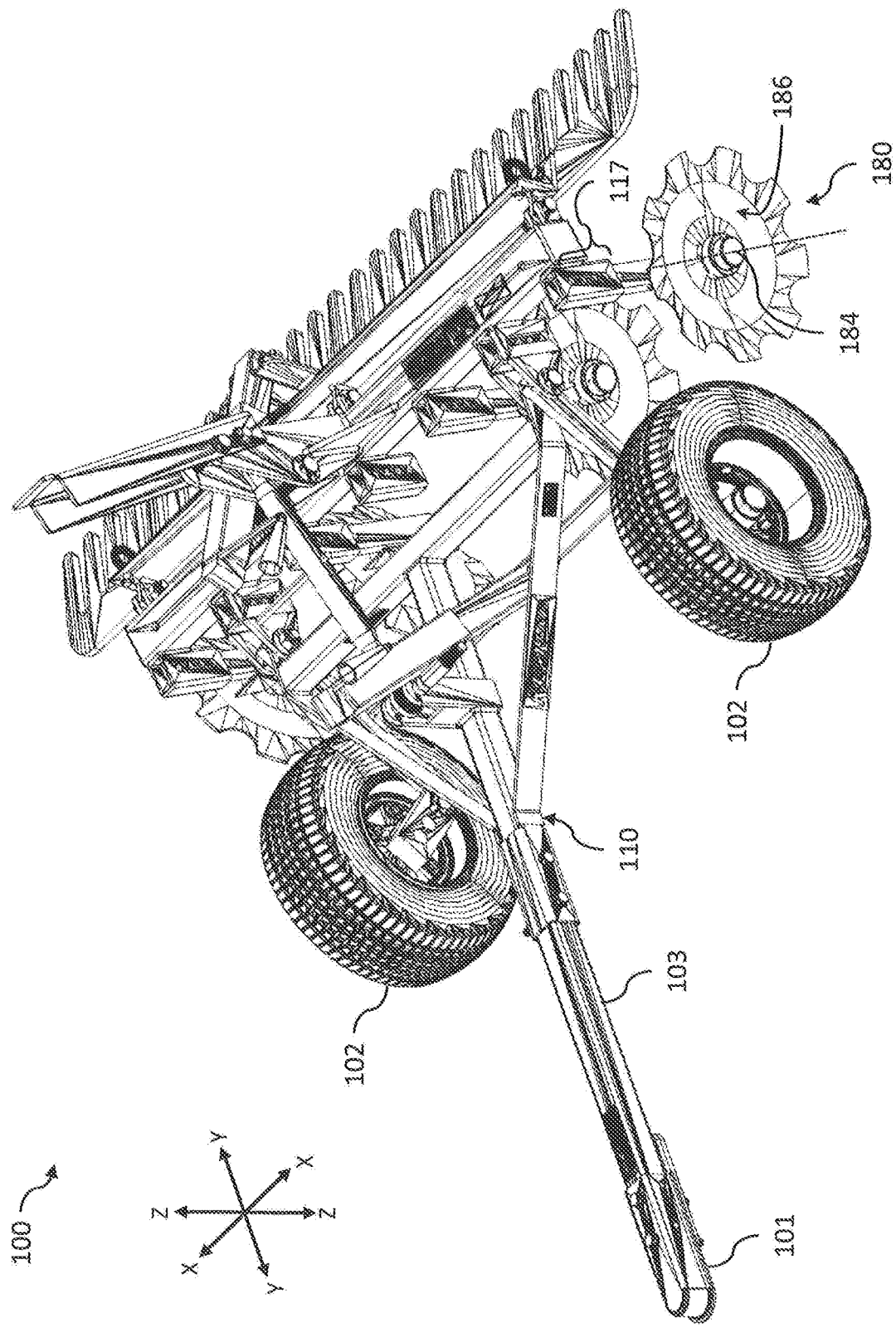
FIG. 1 is a perspective view of a towable tool according to a first example embodiment.
Figure 2:
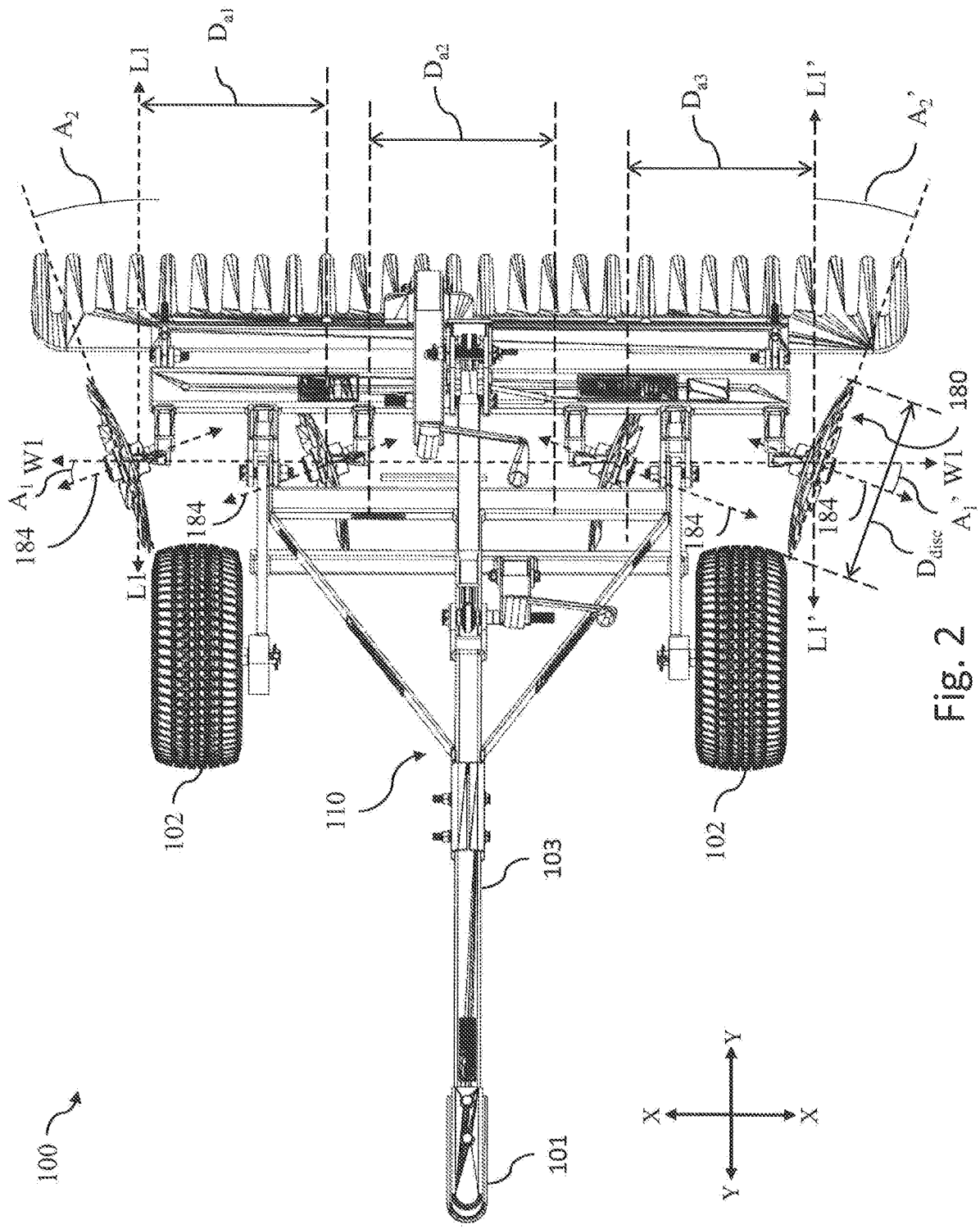
FIG. 2 is a top view of the towable tool of FIG. 1.
Figure 3:
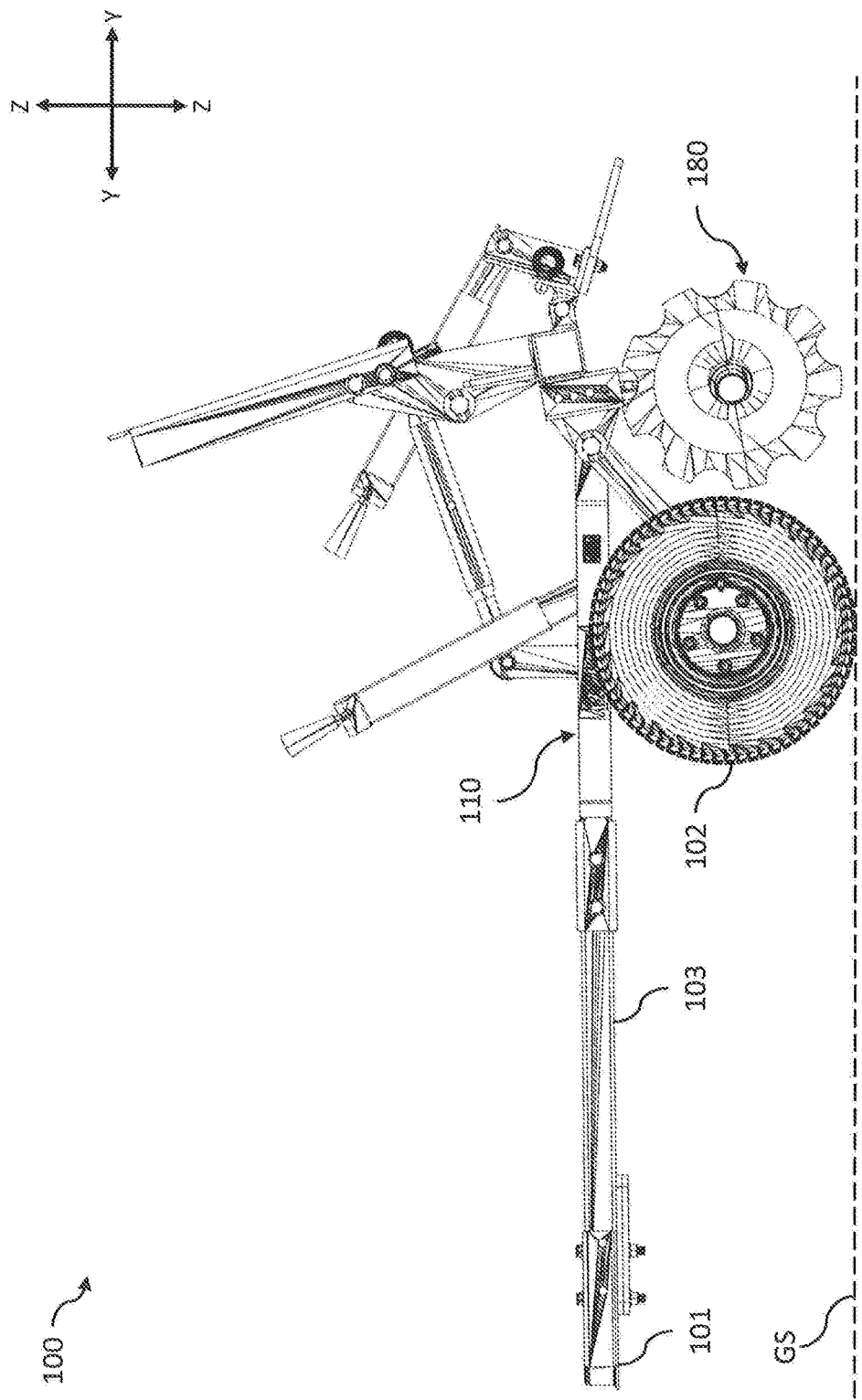
FIG. 3 is a side view of the towable tool of FIG. 1 in a first state of adjustment.
Figure 4:
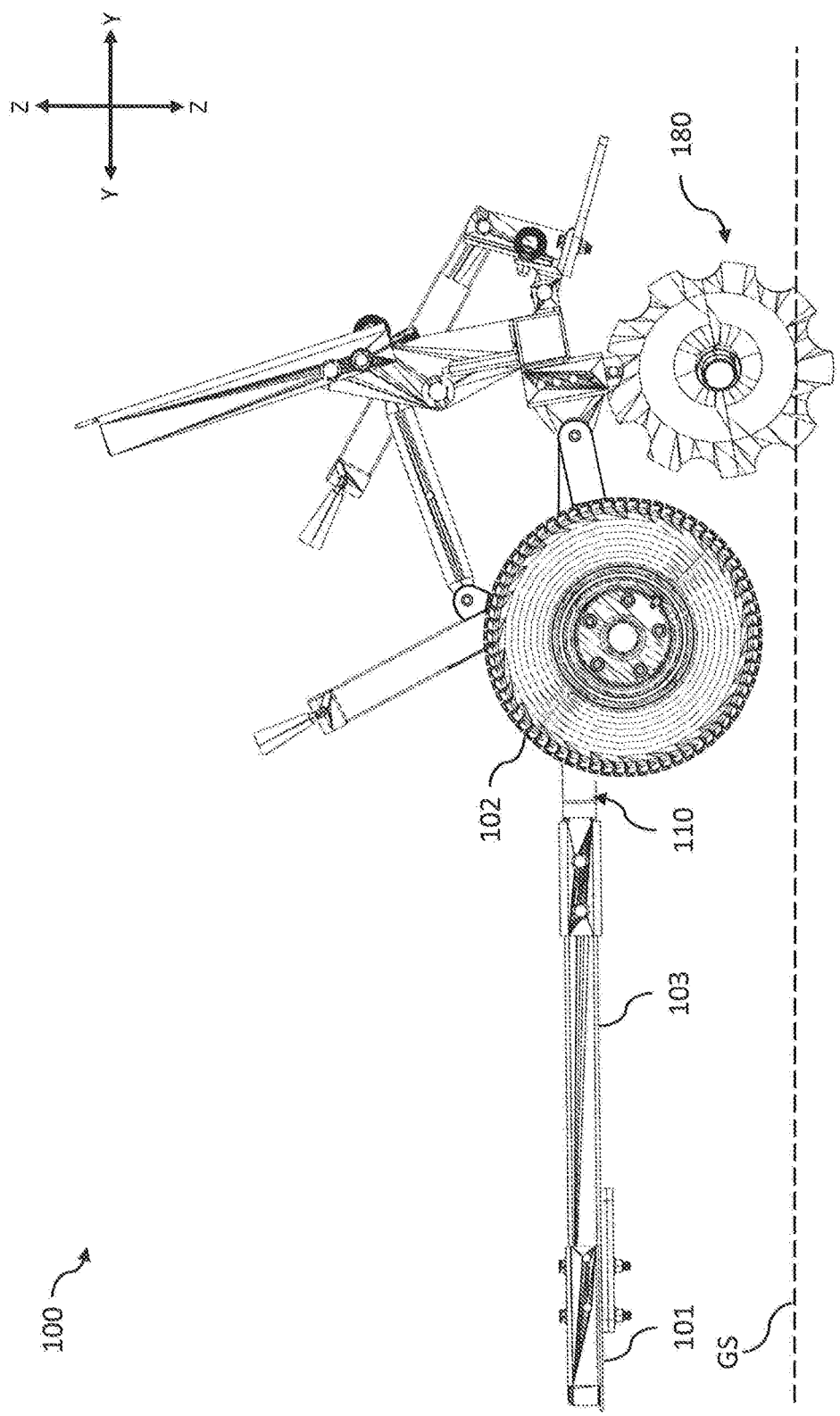
FIG. 4 is a side view of the towable tool of FIG. 1 in a second state of adjustment.
Figure 5:
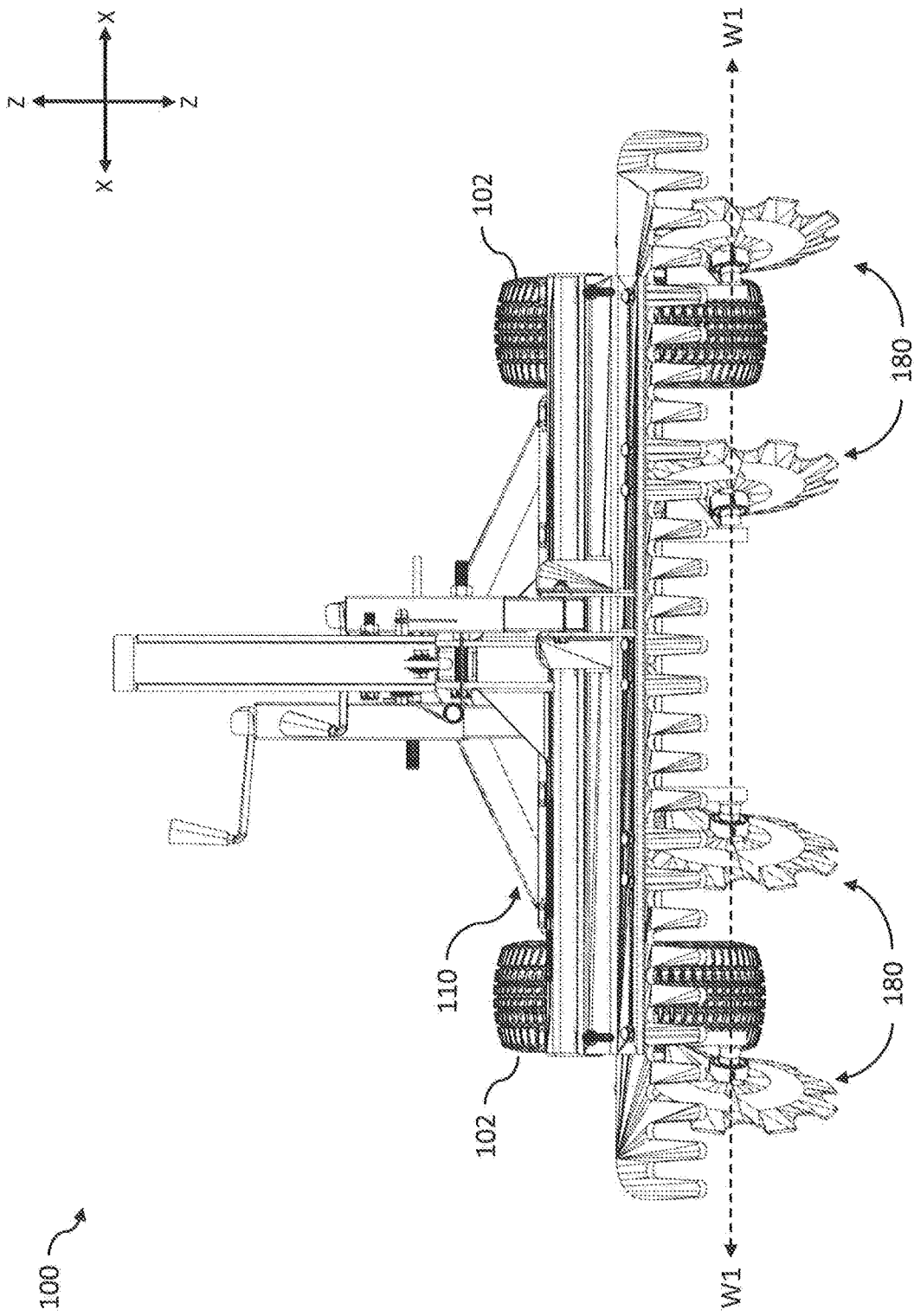
FIG. 5 is a rear view of the towable tool of FIG. 1.
Figure 6:
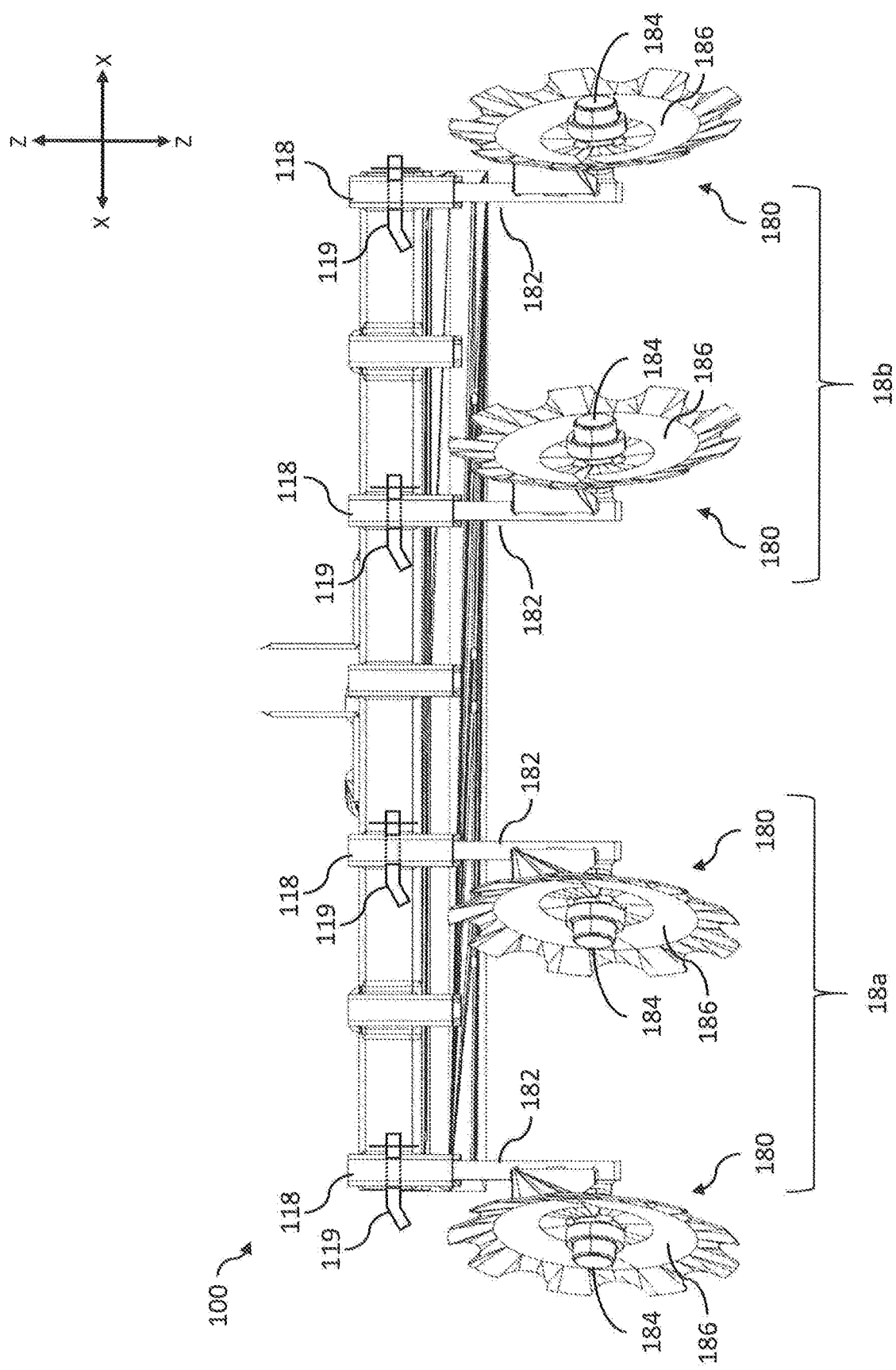
FIG. 6 is a front view of a portion of the towable tool of FIG. 1.
Figure 7:
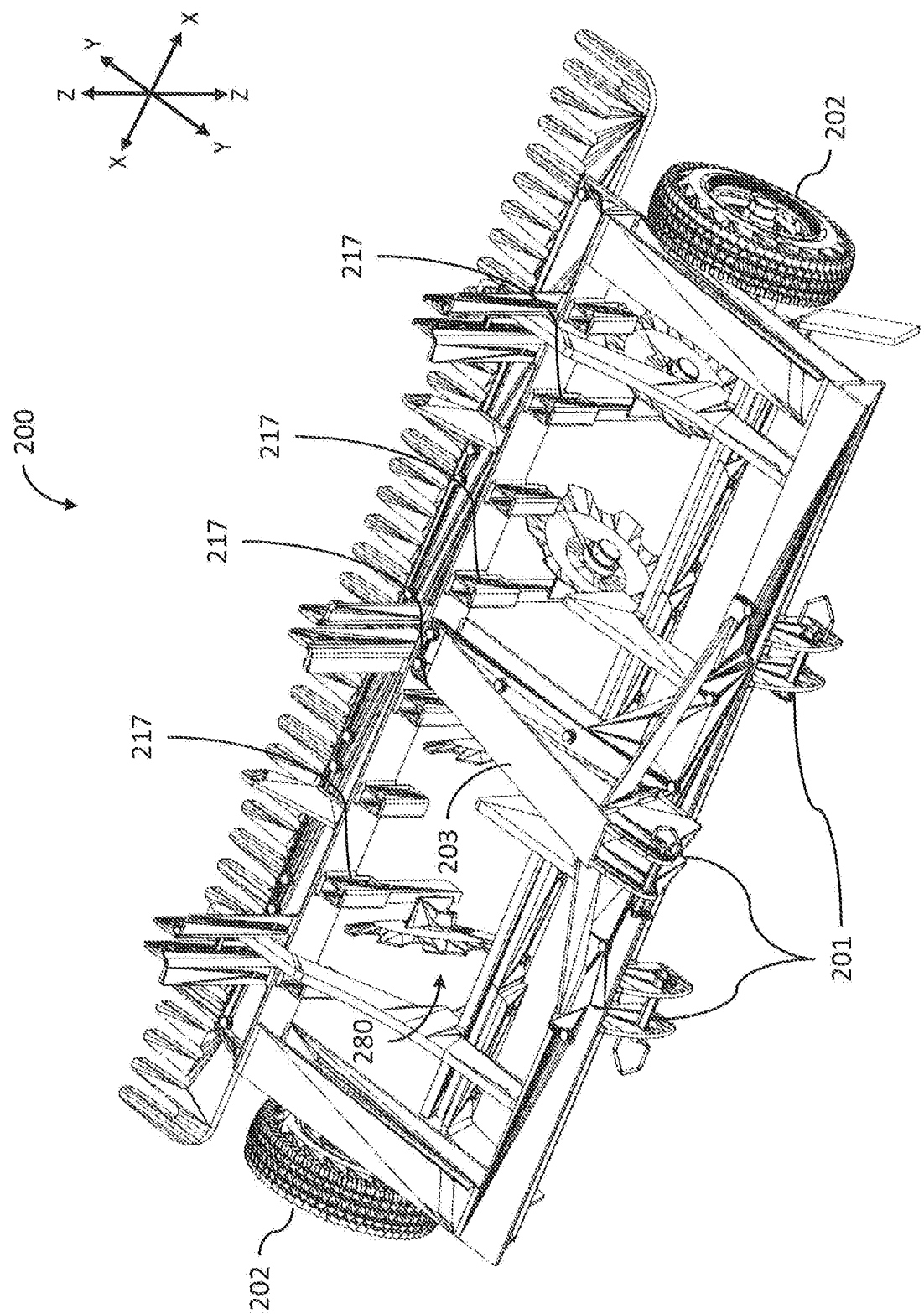
FIG. 7 is a perspective view of a towable tool according to a second example embodiment.

With reference to FIGS. 1-6, there are illustrated several views depicting a number of aspects of a towable tool 100 according to an example embodiment of the present disclosure. The towable tool 100 includes a frame 110 which extends over a width in an X-axis direction, a length in a Y-axis direction, and a height in an X-axis direction as indicated by the illustrated X-Y-Z coordinate system arrows. The towable tool 100 includes a plurality of ground-contacting support wheels 102 which are rotatably coupled with the frame 110 and which support the frame 110 above an underlying ground surface GS in certain states of adjustment. A plurality of ground-working discs 180 are rotatably coupled with respective rigid shanks 182 which are received and selectably retained in respective receptacles 118 of the frame 110. As illustrated in FIG. 3, in some states of adjustment, the ground-contacting support wheels 102 may contact the underlying ground surface GS the plurality of ground-working discs 180 may be raised above the underlying ground surface GS. As illustrated in FIG. 4, in some states of adjustment, the ground-contacting support wheels 102 may be raised above the underlying ground surface GS the plurality of ground-working discs 180 may contact the underlying ground surface GS.

The towable tool 100 includes a single-point hitch attachment 101 which is configured to matingly coupled with a corresponding single-point hitch attachment of a work machine, for example, a lawn tractor or lawnmower, and ATV, a tractor, or a self-propelled work machine of the types disclosed in U.S. Pat. Nos. 10,492,354 and 10,287,745. The single point hitch attachment 101 is provided at an attachment end of a tow or draw tongue 103 of the frame 110.

Each of the plurality of ground-working discs 180 includes a concave face surface 186 extending radially outward from an axis of rotation 184 and are rotatably coupled with a respective rigid shank 182. The rigid shanks 182 are received in respective receptacles 118 of the frame 110 and retained therein by respective fasteners 119. Each concave face surface 186 of a first set of the ground-working discs 18a is oriented in a first forward-facing direction offset from the Y-axis direction. Each concave face surface 186 of a second set of the ground-working discs 18b is oriented in a second forward-facing direction offset from the Y-axis direction, the first forward-facing direction being different than the second forward-facing direction.

The fasteners 119 may be provided in a number of forms including, for example, as bolts, bolt and nut combinations which may include combinations of threaded bolts and matingly threaded wing nuts, screws, or pins such as clevis pins, hitch pins, cotterless hitch pins, wire lock pins, safety pins, tension pins, or other types of fasteners. The fasteners 119 are manually engageable by an operator without the use of a tool to prevent removal of the respective shank from the respective pocket and manually disengageable by an operator without the use of a tool to permit prevent removal of the respective shank from the respective pocket. A plurality of receiving apertures 117 are defined by the receptacles 118 (and may additionally or alternatively be defined in the rigid shanks) permitting fasteners 119 to be engaged with different ones of the receiving apertures 117 to vary Z-axis positioning of the plurality of ground-working discs 180 relative to the frame 110.

The plurality of ground-working discs 180 are arranged in and provided as a single row of ground working discs with each axis of rotation 184 intersecting a line (e.g., line W1) parallel to the X-axis direction, the single row consisting of all of the ground-working discs of the towable tool apparatus. The axes of rotation 184 may be offset from the line W1 by an angle of 20 degrees+/−10% (e.g., angles A1, A1') and thus offset from a line parallel with the Y-axis direction by an angle of 70 degrees+/−10%. The radial outward direction extending from the axes of rotation 184 may be offset from a line (e.g., lines L1, L1') parallel with the Y-axis direction by an angle of 20 degrees+/−10% (e.g., angles A2, A2') and thus offset from a line parallel with the X-axis direction by an angle of 70 degrees+/−10%.

The plurality of ground-working discs 180 may be spaced apart from each neighboring one of the plurality of ground-working discs at a distance (e.g., distance $D_{a1}$, $D_{b2}$, $D_{c3}$) which may be equal to or greater than 1.4 times the radius of each disc or may be equal to or greater than 2 times the radius of each disc. Such distances may be measured from a point of intersection of a midpoint of an axis of rotation and a line extending in the X-axis direction of each of the ground-working disc and said point of intersection of each adjacent ground-working disc. In some forms, each of the plurality of ground-working discs 180 may have a diameter $D_{disc}$ of about 14 inches and may be spaced apart from each neighboring one of the plurality of ground-working discs at a distance of about 10 inches or more.

In the embodiment of FIGS. 1-6, the plurality of ground-working discs 180 consists of four discs. Other embodiments may include different numbers of ground-working discs, for example, six ground working discs or eight ground working discs. While in principle other numbers of discs may be utilized, in preferred forms, the plurality of ground-working discs consists of four discs or six discs which are oriented and positioned to provide offsetting resistance forces in the X-axis direction from engagement of the plurality of ground-working discs 180 an underlying ground surface during operation of the towable tool 100. The As shown most clearly in the view of FIG. 2, the plurality of ground-working discs 180 of the towable tool 100 extend in the Y-axis direction that overlaps at least in part with the extent of the ground-contacting support wheels in the Y-axis direction. In some forms, the plurality of ground-working discs 180 extend in the Y-axis direction to an extent that overlaps entirely with the extent of the ground-contacting support wheels in the Y-axis direction. The plurality of ground-working discs 180 are also positioned rearward of the ground-contacting support wheels 102. This positioning provides a positive tongue weight on the single point hitch attachment 101 is provided at an attachment end of a tow or draw tongue 103 of the frame 110 when the towable tool is adjusted to an operating state of the plurality of ground-working discs 180, for example, when the ground-contacting support wheels 102 are moved from a lowered position such as illustrated in FIG. 3, to a raised position such as illustrated in FIG. 4.

With reference to FIGS. 7-12, there are illustrated several views depicting a number of aspects of a towable tool 200 according to an example embodiment of the present disclosure. The towable tool 200 also includes a number of features that may generally correspond to but may also vary in one or more respects from those illustrated and described in connection with the towable tool 100, and such features are indicated with reference numerals incremented by 100 relative to those used in the illustration description of the towable tool 100.

Figure 9:
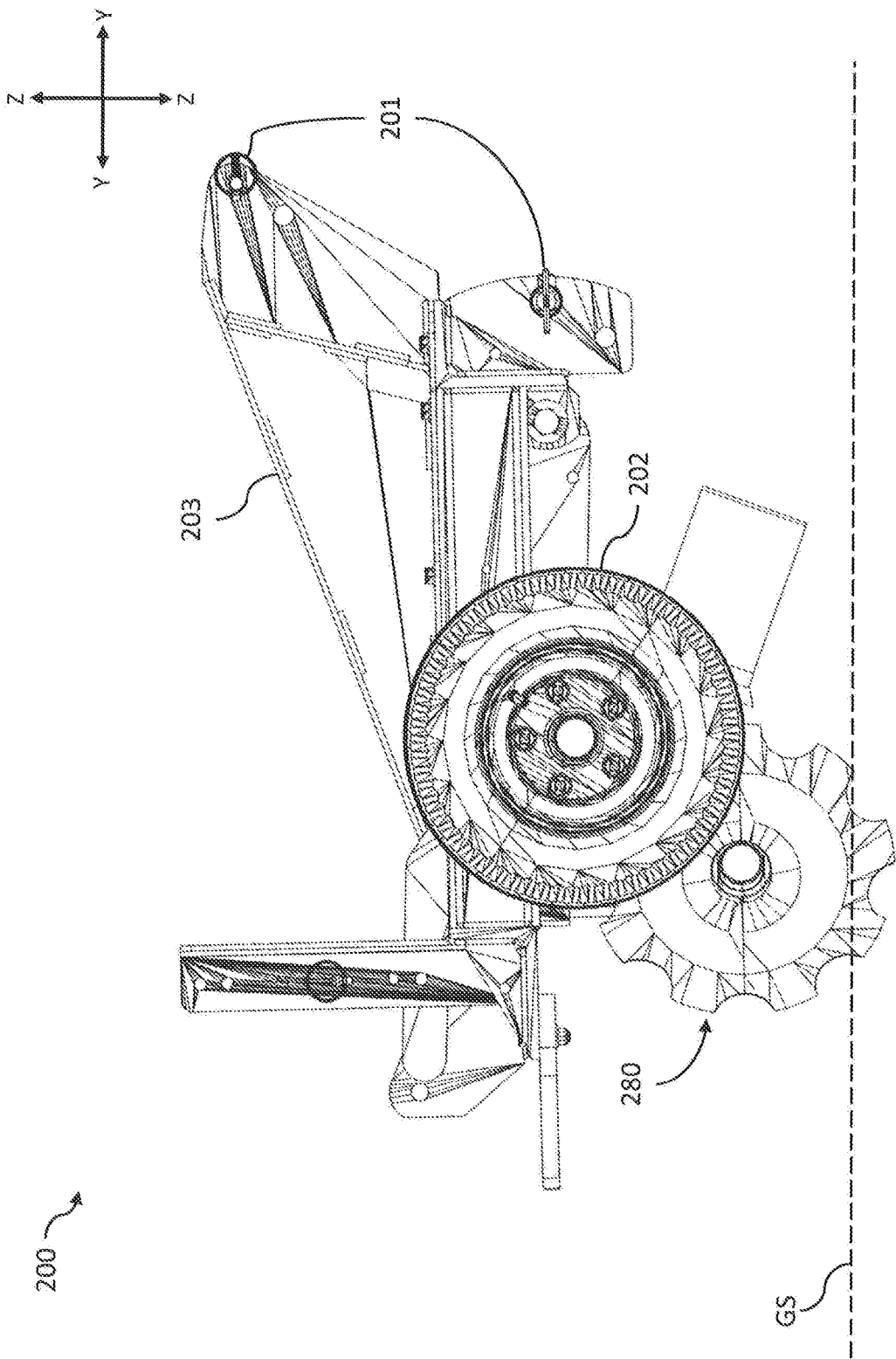
FIG. 9 is a side view of the towable tool of FIG. 7 in a first state of adjustment.
Figure 10:
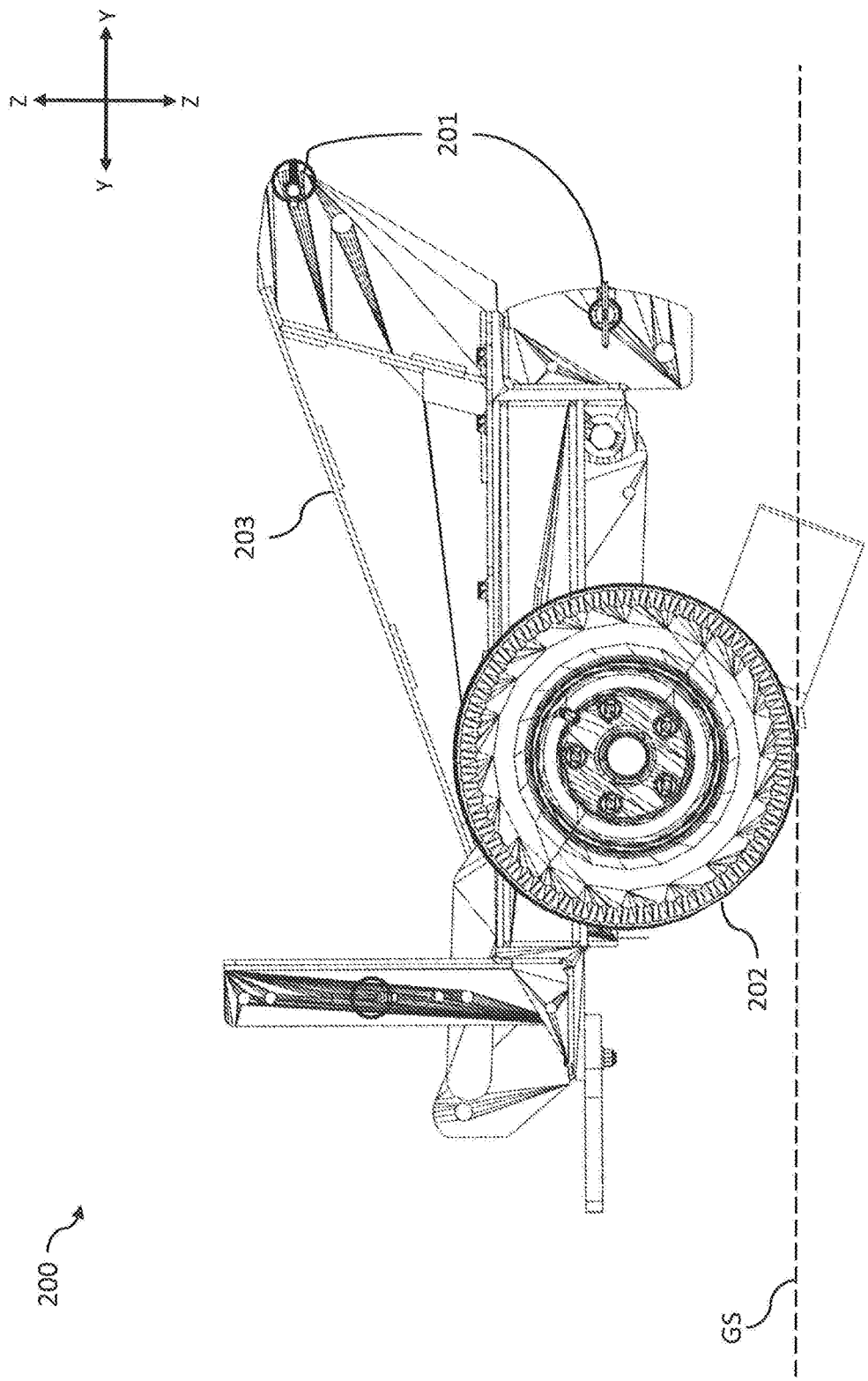
FIG. 10 is a side view of the towable tool of FIG. 7 in a second state of adjustment.
Figure 11:
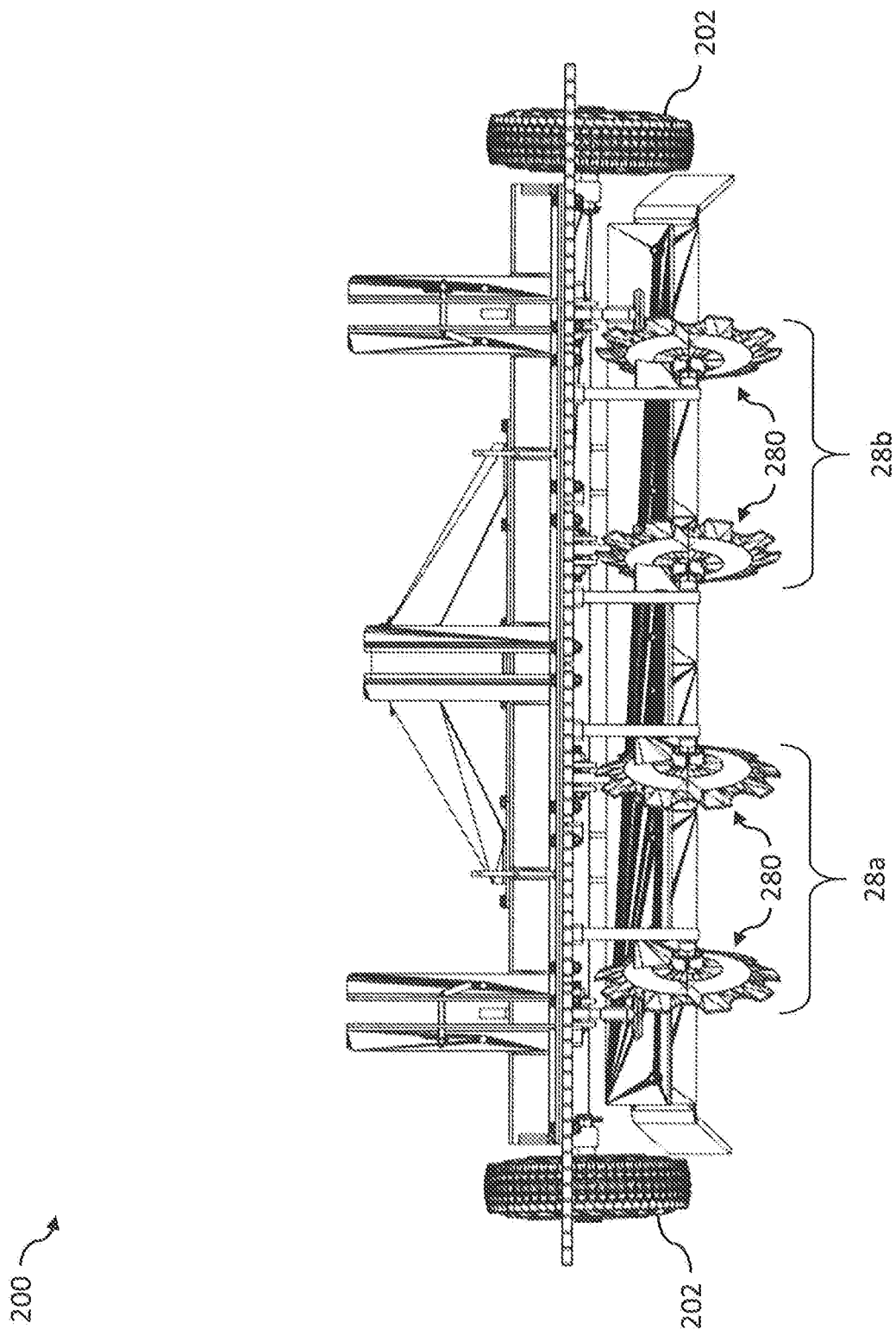
FIG. 11 is a rear view of the towable tool of FIG. 7.
Figure 12:
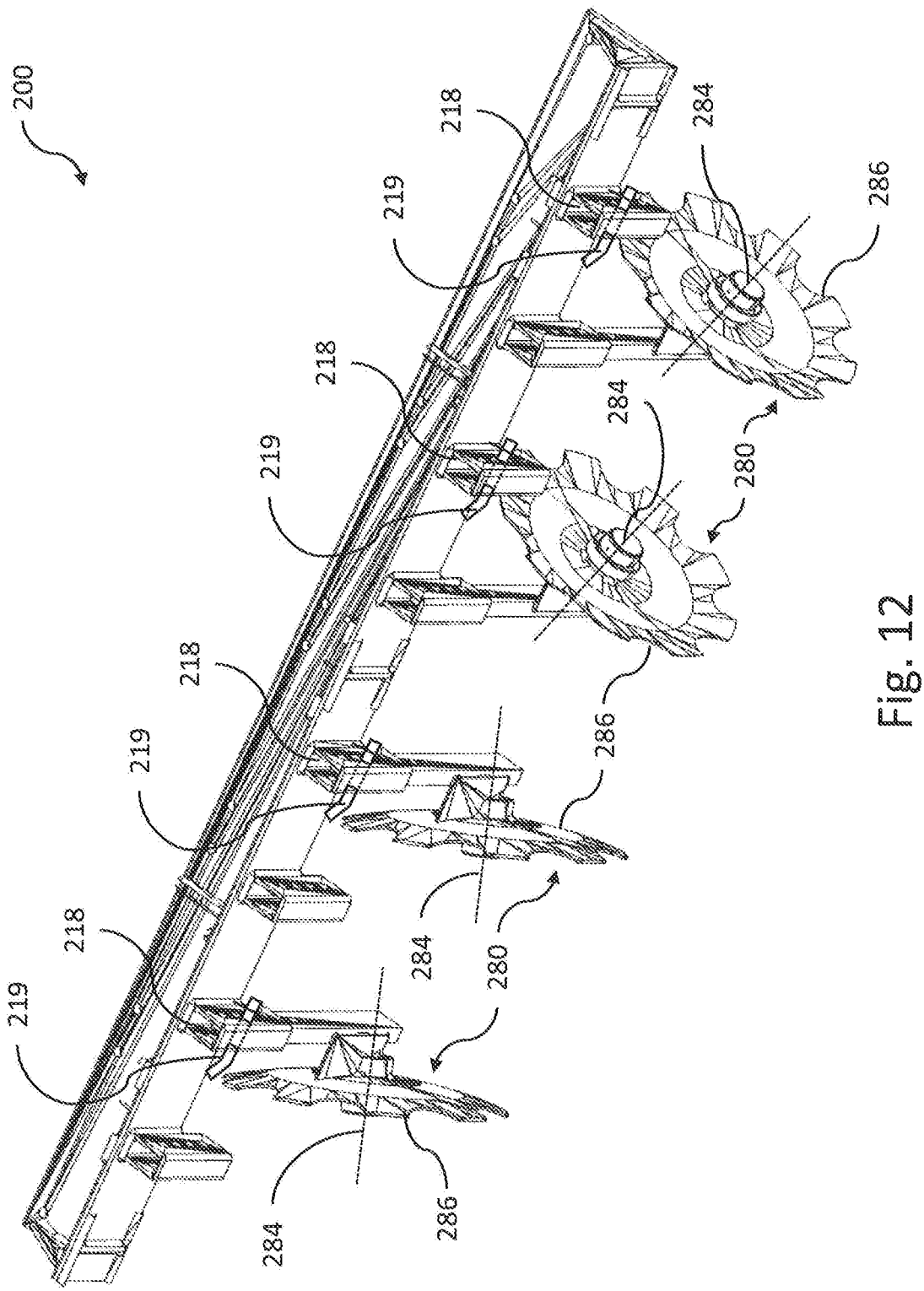
FIG. 12 is a perspective view of a portion of the towable tool of FIG. 7.
Figure 13:
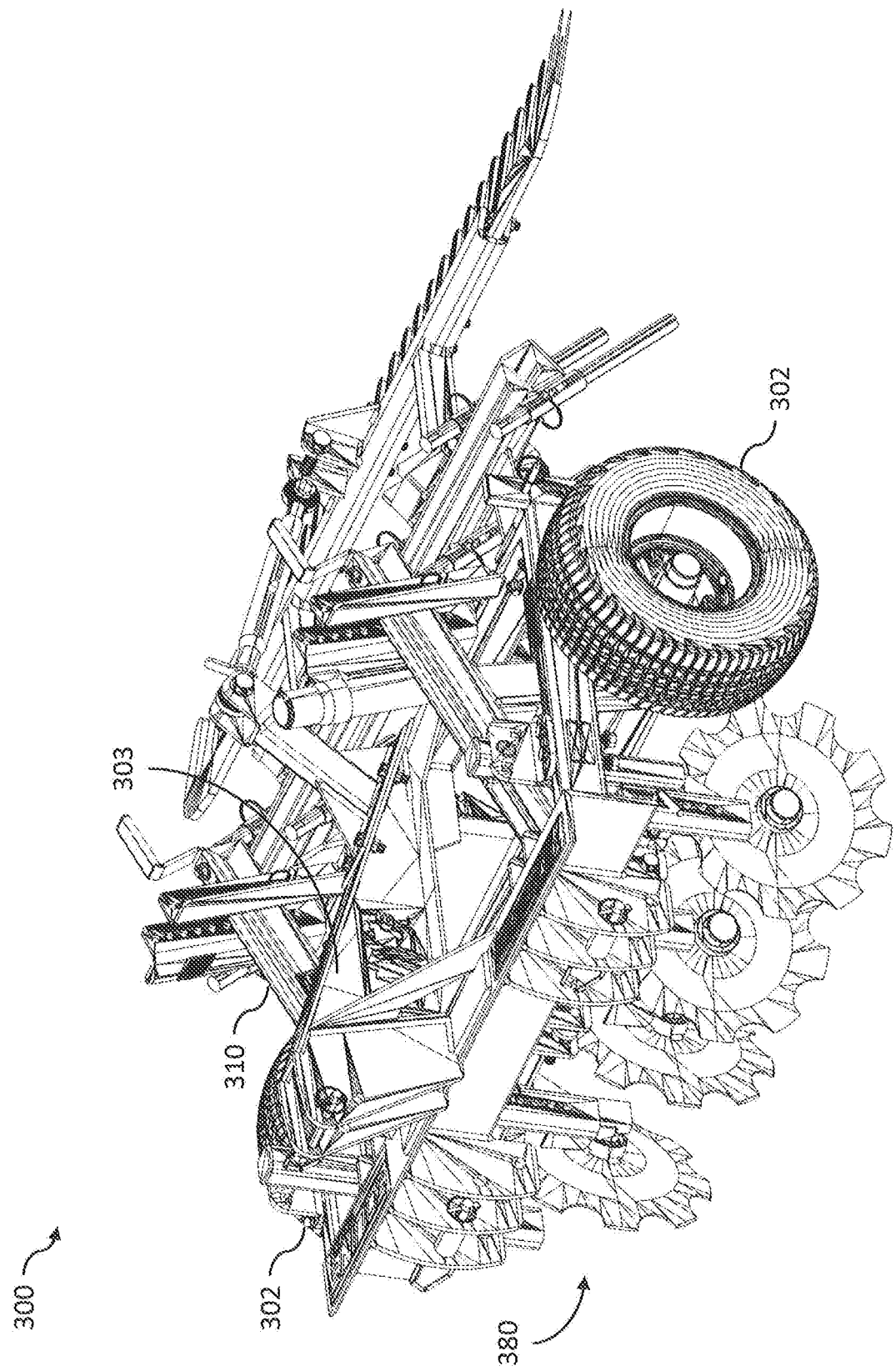
FIG. 13 is a perspective view of a towable tool according to a third example embodiment.
Figure 14:
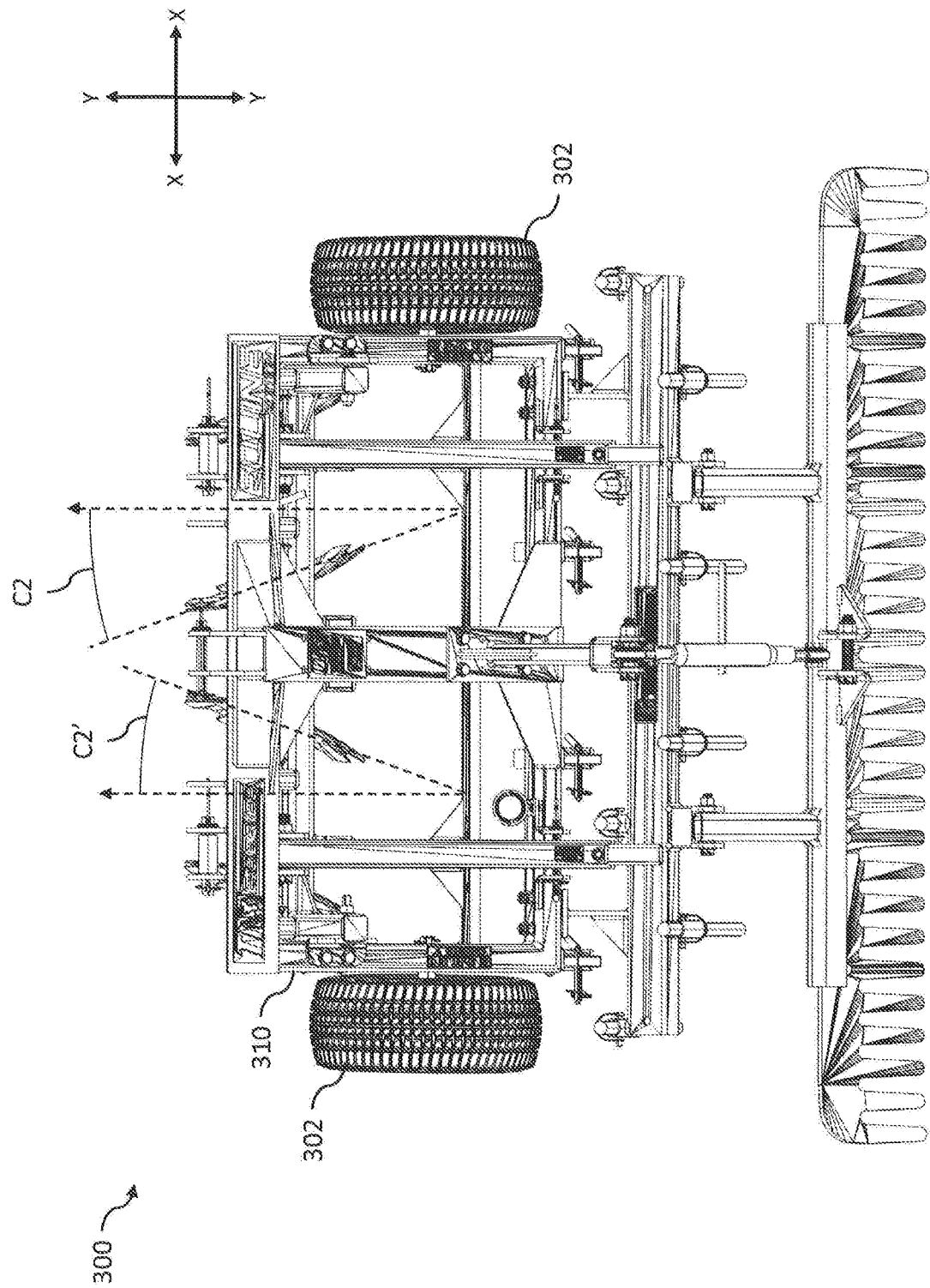
FIG. 14 is a top view of the towable tool of FIG. 13.
Figure 15:
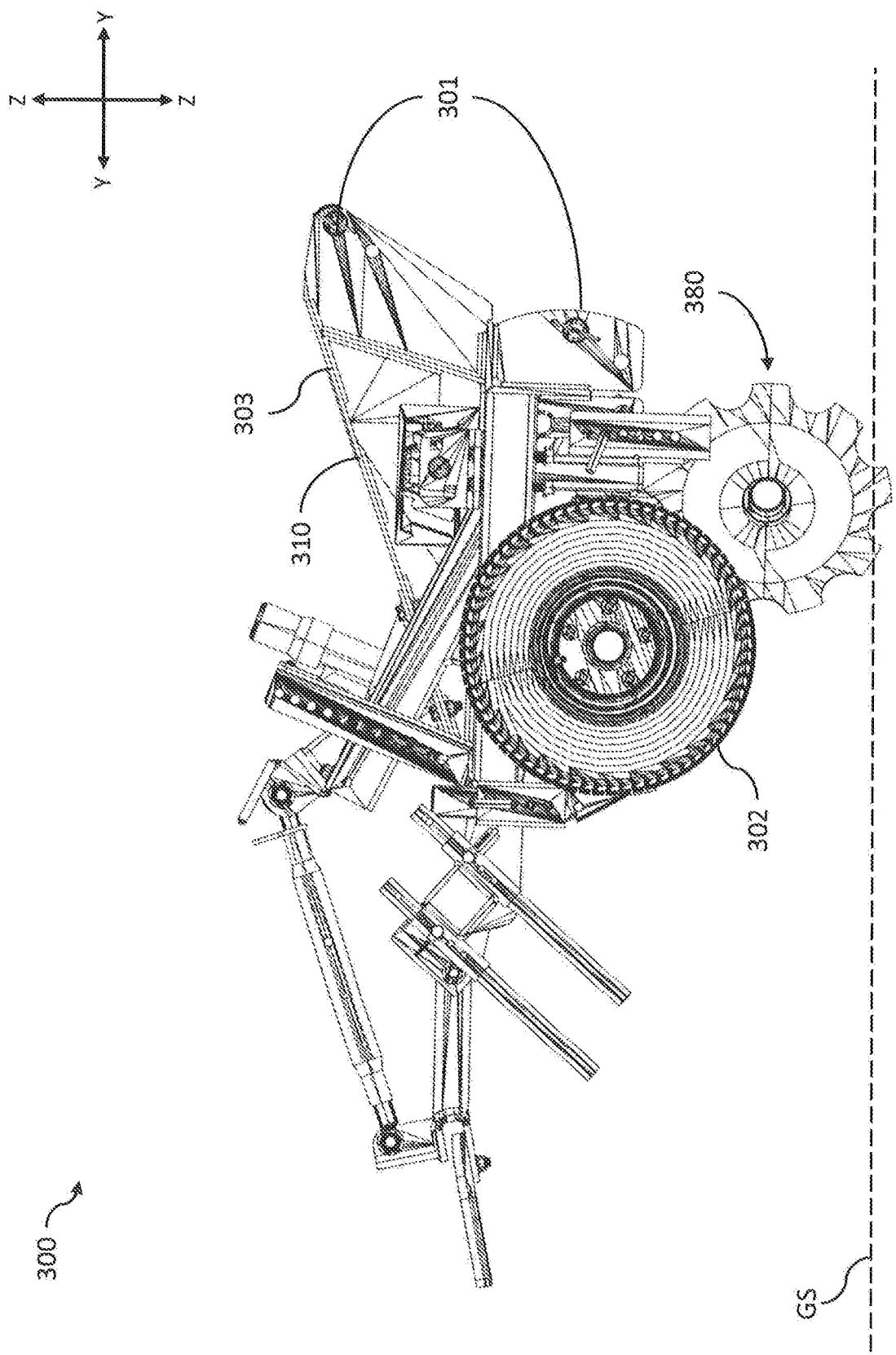
FIG. 15 is a side view of the towable tool of FIG. 13 in a first state of adjustment.
Figure 16:
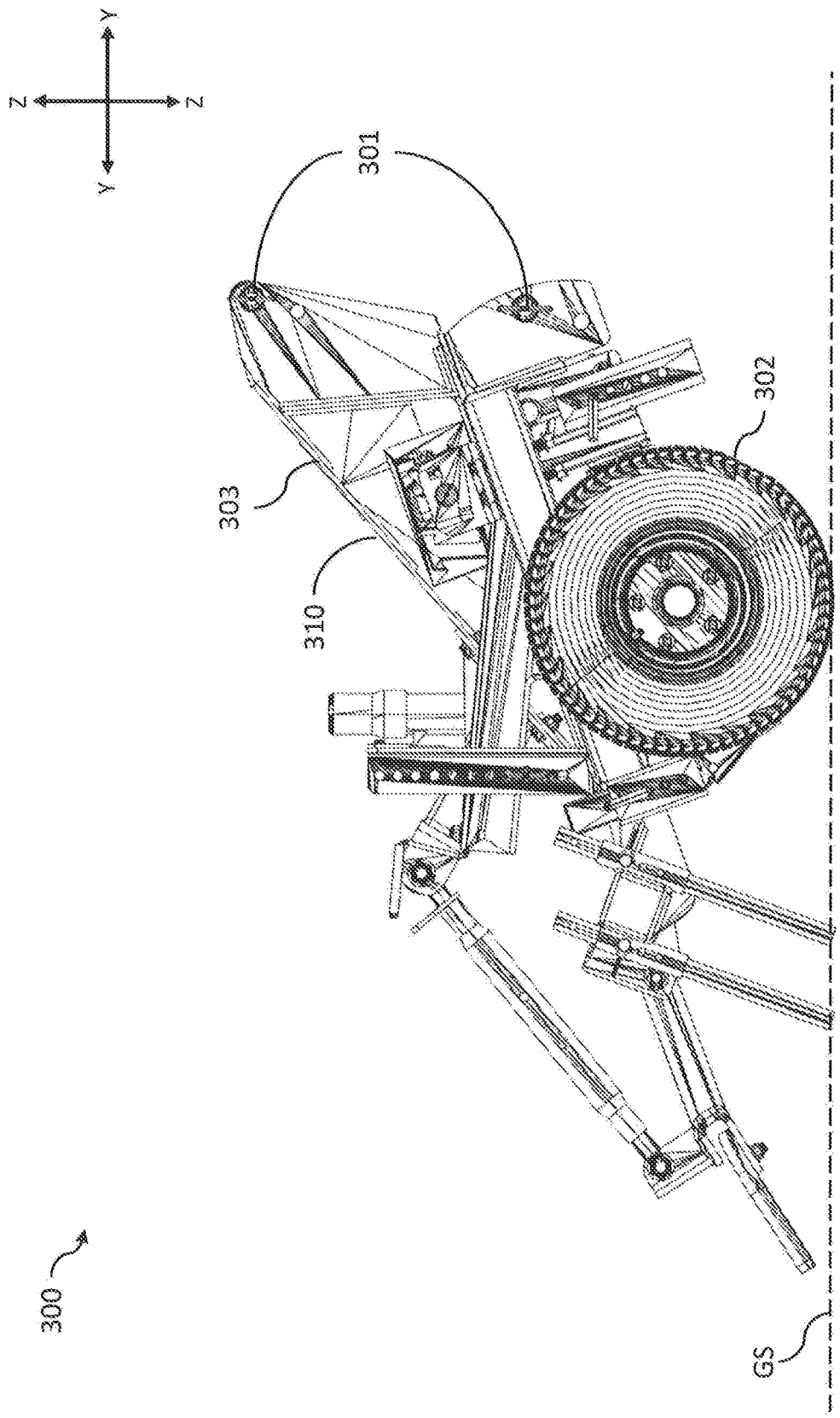
FIG. 16 is a side view of the towable tool of FIG. 13 in a second state of adjustment. forward to FIG. 17 is a rear view of the towable tool of FIG. 13.
Figure 17:
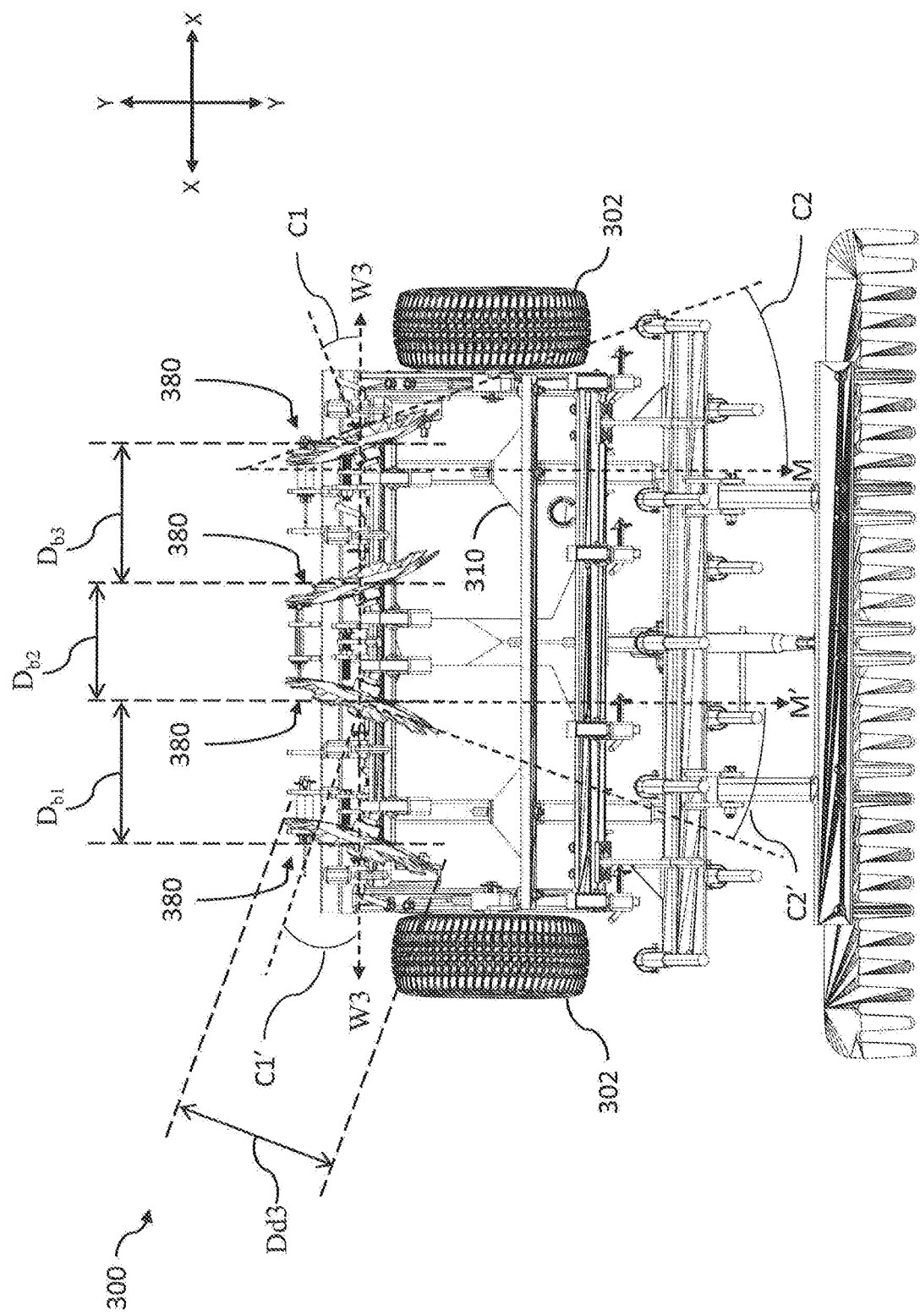
Figure 18:
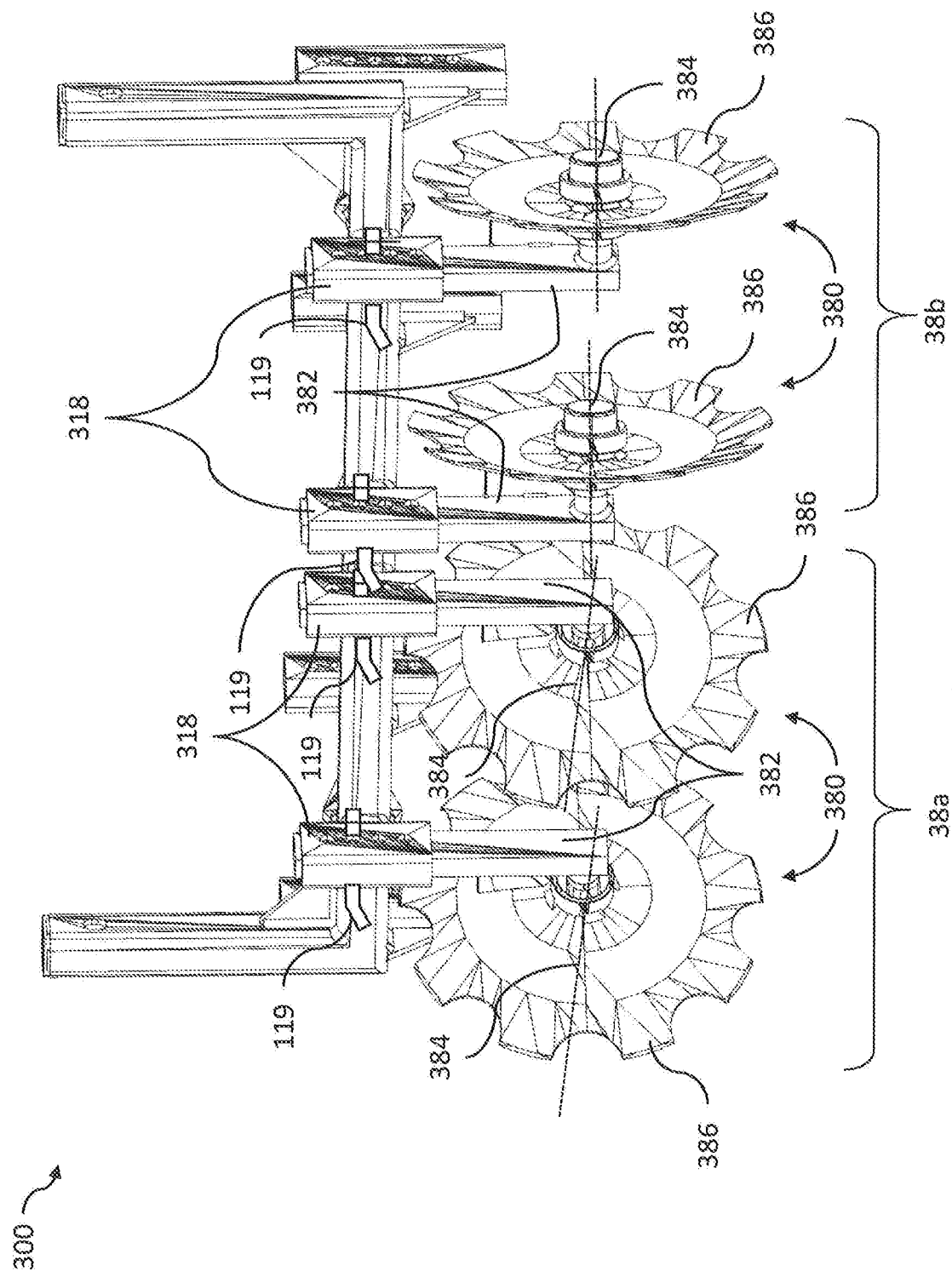
FIG. 18 is a perspective view of a portion of the towable tool of FIG. 13.

The towable tool 200 includes a frame 210 which extends over a width in an X-axis direction, a length in a Y-axis direction, and a height in an X-axis direction as indicated by the illustrated X-Y-Z coordinate system arrows. The towable tool 200 includes a plurality of ground-contacting support wheels 202 which are rotatably coupled with the frame 210 and which support the frame 210 above an underlying ground surface GS in certain states of adjustment. A plurality of ground-working discs 280 are rotatably coupled with respective rigid shanks 282 which are received and selectably retained in respective receptacles 218 of the frame 210. As illustrated in FIG. 10, in some states of adjustment, the ground-contacting support wheels 202 may contact the underlying ground surface GS and the plurality of ground-working discs 280 may be removed. As illustrated in FIG. 9, in some states of adjustment, the ground-contacting support wheels 202 may be raised above the underlying ground surface GS the plurality of ground-working discs 280 may be installed and brought into contact the underlying ground surface GS. The towable tool 200 includes a three hitch attachment 201 which is configured to matingly coupled with a corresponding three hitch attachment of a work machine, for example, a tractor or another type of self-propelled work machine.

The plurality of ground-working discs 280 include a concave face surface 286 extending radially outward from an axis of rotation 284 and are rotatably coupled with a respective rigid shank 282. The rigid shanks 282 are received in respective receptacles 218 of the frame 210 and retained therein by respective fasteners 219. Each concave face surface 286 of a first set of the ground-working discs 28a is oriented in a first forward-facing direction offset from the Y-axis direction. Each concave face surface 286 of a second set of the ground-working discs 28b is oriented in a second forward-facing direction offset from the Y-axis direction, the first forward-facing direction being different than the second forward-facing direction.

The fasteners 219 may be provided in a number of forms including, for example, as bolts, bolt and nut combinations which may include combinations of threaded bolts and matingly threaded wing nuts, screws, or pins such as clevis pins, hitch pins, cotterless hitch pins, wire lock pins, safety pins, tension pins, or other types of fasteners. The fasteners 219 are manually engageable by an operator without the use of a tool to prevent removal of the respective shank from the respective pocket and manually disengageable by an operator without the use of a tool to permit prevent removal of the respective shank from the respective pocket. A plurality of receiving apertures 217 are be defined the receptacles 218 (and may additionally or alternatively be defined in the rigid shanks) permitting fasteners 219 to be engaged with different ones of the receiving apertures 217 to vary Z-axis positioning of the plurality of ground-working discs 280 relative to the frame 210.

The plurality of ground-working discs 280 are arranged in and provided as a single row of ground working discs with each axis of rotation 284 intersecting a line (e.g., line W2) parallel to the X-axis direction, the single row consisting of all of the ground-working discs of the towable tool apparatus. The axes of rotation 284 may be offset from the line W2 by an angle of 20 degrees+/−10% (e.g., angles B1, B1') and thus offset from a line parallel with the Y-axis direction by an angle of 70 degrees+/−10%. The radial outward direction extending from the axes of rotation 284 may be offset from a line (e.g., lines M1, M1') parallel with the Y-axis direction by an angle of 20 degrees+/−10% (e.g., angles B2, B2') and thus offset from a line parallel with the X-axis direction by an angle of 70 degrees+/−10%.

The plurality of ground-working discs 280 may be spaced apart from each neighboring one of the plurality of ground-working discs at a distance (e.g., distance $D_{b1}$, $D_{b2}$, $D_{b3}$) which may be equal to or greater than 1.4 times the radius of each disc or may be equal to or greater than 2 times the radius of each disc. Such distances may be measured from a point of intersection of a midpoint of an axis of rotation and a line extending in the X-axis direction of each of the ground-working disc and said point of intersection of each adjacent ground-working disc. In some forms, each of the plurality of ground-working discs 280 may have a diameter $D_{disc}$ of about 14 inches and may be spaced apart from each neighboring one of the plurality of ground-working discs at a distance of about 10 inches or more.

In the embodiment of FIGS. 7-12, the plurality of ground-working discs 280 consists of four discs. Other embodiments may include different numbers of ground-working discs, for example, six ground working discs or eight ground working discs. While in principle other numbers of discs may be utilized, in preferred forms, the plurality of ground-working discs consists of four discs or six discs which are oriented and positioned to provide offsetting resistance forces in the X-axis direction from engagement of the plurality of ground-working discs 280 an underlying ground surface during operation of the towable tool 200.

Figure 8:
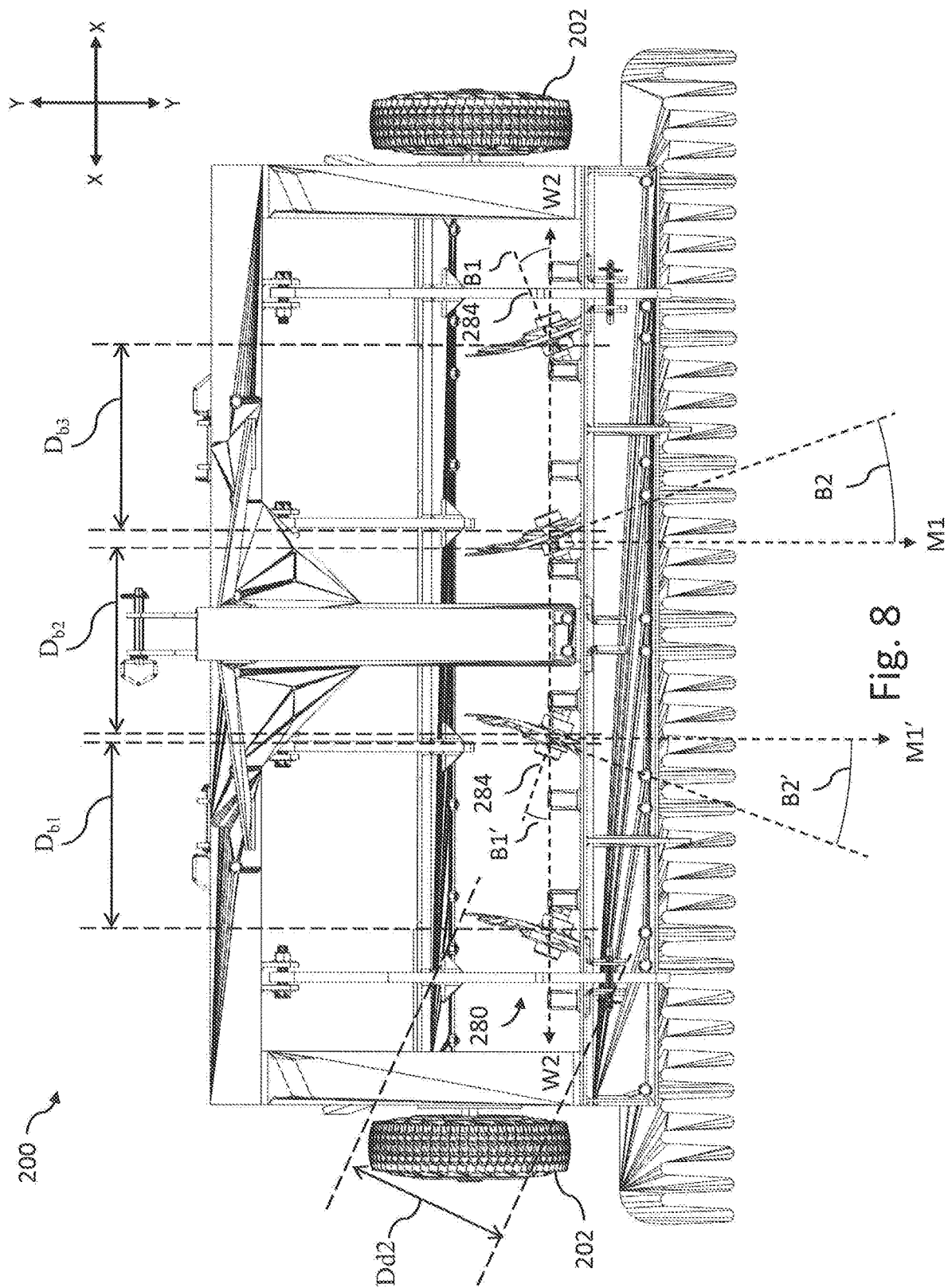
FIG. 8 is a top view of the towable tool of FIG. 7.

As shown most clearly in the view of FIG. 8, the plurality of ground-working discs 280 of the towable tool 200 extend in the Y-axis direction that overlaps at least in part with the extent of the ground-contacting support wheels in the Y-axis direction. In some forms, the plurality of ground-working discs 280 extend in the Y-axis direction to an extent that overlaps entirely with the extent of the ground-contacting support wheels in the Y-axis direction. The plurality of ground-working discs 280 are also positioned rearward of the ground-contacting support wheels 202.

Depending on the height or depth settings and the degree of adjustability provided by the work machine with which the towable tool 200 is coupled, it may be possible to adjust the front-to-rear tilt of the towable tool 200 relative to the X-Y plane to adjust the towable tool 200 between a position in which the ground-contacting support wheels 202 are brought into contact the underlying ground surface GS and the plurality of ground-working discs 280 are raised above the underlying ground surface GS and a position in which the ground-contacting support wheels 202 are raised above the underlying ground surface GS the plurality of ground-working discs 280 are brought into contact the underlying ground surface GS while keeping the plurality of ground-working discs 280 installed in the tool.

With reference to FIGS. 13-18, there are illustrated several views depicting a number of aspects of a towable tool 300 according to an example embodiment of the present disclosure. The towable tool 300 also includes a number of features that may generally correspond to but may also vary in one or more respects from those illustrated and described in connection with the towable tool 100, and such features are indicated with reference numerals incremented by 200 relative to those used in the illustration description of the towable tool 100.

The towable tool 300 includes a frame 310 which extends over a width in an X-axis direction, a length in a Y-axis direction, and a height in an X-axis direction as indicated by the illustrated X-Y-Z coordinate system arrows. The towable tool 300 includes a plurality of ground-contacting support wheels 302 which are rotatably coupled with the frame 310 and which support the frame 310 above an underlying ground surface GS in certain states of adjustment. A plurality of ground-working discs 380 are rotatably coupled with respective rigid shanks 382 which are received and selectably retained in respective receptacles 318 of the frame 310. As illustrated in FIG. 10, in some states of adjustment, the ground-contacting support wheels 302 may contact the underlying ground surface GS and the plurality of ground-working discs 380 may be removed. As illustrated in FIG. 9, in some states of adjustment, the ground-contacting support wheels 302 may be raised above the underlying ground surface GS the plurality of ground-working discs 380 may be installed and brought into contact the underlying ground surface GS. The towable tool 300 includes a three hitch attachment 301 which is configured to matingly coupled with a corresponding three hitch attachment of a work machine, for example, a tractor or another type of self-propelled work machine.

The plurality of ground-working discs 380 include a concave face surface 386 extending radially outward from an axis of rotation 384 and are rotatably coupled with a respective rigid shank 382. The rigid shanks 382 are received in respective receptacles 318 of the frame 310 and retained therein by respective fasteners 319. Each concave face surface 386 of a first set of the ground-working discs 38a is oriented in a first forward-facing direction offset from the Y-axis direction. Each concave face surface 386 of a second set of the ground-working discs 38b is oriented in a second forward-facing direction offset from the Y-axis direction, the first forward-facing direction being different than the second forward-facing direction.

The fasteners 319 may be provided in a number of forms including, for example, as bolts, bolt and nut combinations which may include combinations of threaded bolts and matingly threaded wing nuts, screws, or pins such as clevis pins, hitch pins, cotterless hitch pins, wire lock pins, safety pins, tension pins, or other types of fasteners. The fasteners 319 are manually engageable by an operator without the use of a tool to prevent removal of the respective shank from the respective pocket and manually disengageable by an operator without the use of a tool to permit prevent removal of the respective shank from the respective pocket. A plurality of receiving apertures 317 are be defined the receptacles 318 (and may additionally or alternatively be defined in the rigid shanks) permitting fasteners 319 to be engaged with different ones of the receiving apertures 317 to vary Z-axis positioning of the plurality of ground-working discs 380 relative to the frame 310.

The plurality of ground-working discs 380 are arranged in and provided as a single row of ground working discs with each axis of rotation 384 intersecting a line (e.g., line W3) parallel to the X-axis direction, the single row consisting of all of the ground-working discs of the towable tool apparatus. The axes of rotation 384 may be offset from the line W3 by an angle of 20 degrees+/−10% (e.g., angles B1, B1') and thus offset from a line parallel with the Y-axis direction by an angle of 70 degrees+/−10%. The radial outward direction extending from the axes of rotation 384 may be offset from a line (e.g., lines M1, M1') parallel with the Y-axis direction by an angle of 20 degrees+/−10% (e.g., angles C2, C2') and thus offset from a line parallel with the X-axis direction by an angle of 70 degrees+/−10%.

The plurality of ground-working discs 380 may be spaced apart from each neighboring one of the plurality of ground-working discs at a distance (e.g., distance $D_{b1}$, $D_{b2}$, $D_{b3}$) which may be equal to or greater than 1.4 times the radius of each disc or may be equal to or greater than 2 times the radius of each disc. Such distances may be measured from a point of intersection of a midpoint of an axis of rotation and a line extending in the X-axis direction of each of the ground-working disc and said point of intersection of each adjacent ground-working disc. In some forms, each of the plurality of a plurality of ground-working discs 380 may have a diameter $D_{disc}$ of about 14 inches and may be spaced apart from each neighboring one of the plurality of ground-working discs at a distance of about 10 inches or more.

In the embodiment of FIGS. 7-12, the plurality of ground-working discs 380 consists of four discs. Other embodiments may include different numbers of ground-working discs, for example, six ground working discs or eight ground working discs. While in principle other numbers of discs may be utilized, in preferred forms, the plurality of ground-working discs consists of four discs or six discs which are oriented and positioned to provide offsetting resistance forces in the X-axis direction from engagement of the plurality of ground-working discs 380 an underlying ground surface during operation of the towable tool 300. The As shown most clearly in the view of FIG. 8, the plurality of ground-working discs 380 of the towable tool 300 extend in the Y-axis direction that overlaps at least in part with the extent of the ground-contacting support wheels in the Y-axis direction. In some forms, the plurality of ground-working discs 380 extend in the Y-axis direction to an extent that overlaps entirely with the extent of the ground-contacting support wheels in the Y-axis direction. The plurality of ground-working discs 380 are also positioned rearward of the ground-contacting support wheels 302.

Depending on the height or depth settings and the degree of adjustability provided by the work machine with which the towable tool 300 is coupled, it may be possible to adjust the front-to-rear tilt of the towable tool 300 relative to the X-Y plane to adjust the towable tool 300 between a position in which the ground-contacting support wheels 302 are brought into contact the underlying ground surface GS and the plurality of ground-working discs 380 are raised above the underlying ground surface GS and a position in which the ground-contacting support wheels 302 are raised above the underlying ground surface GS the plurality of ground-working discs 380 are brought into contact the underlying ground surface GS while keeping the plurality of ground-working discs 380 installed in the tool.

Figure 19:
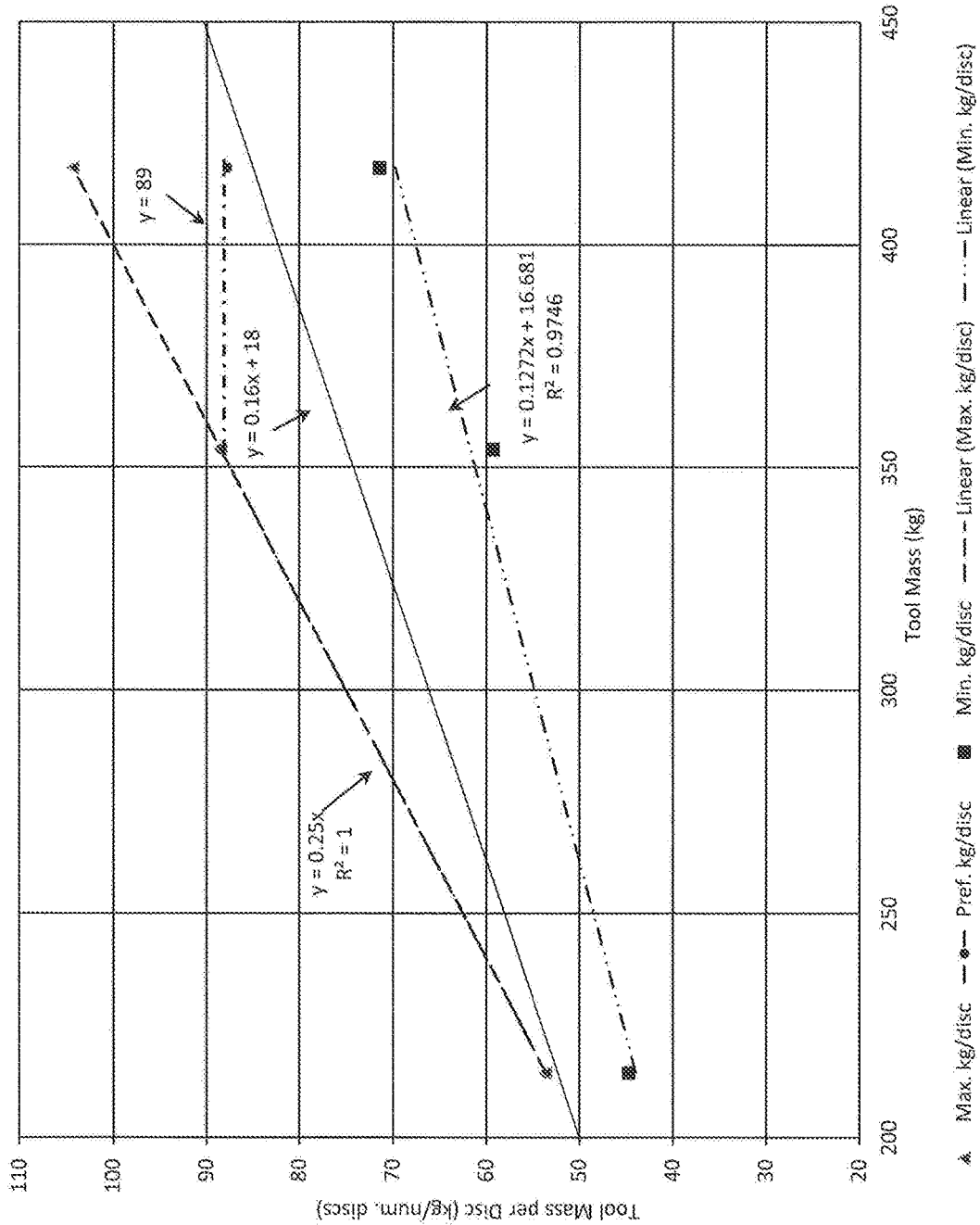
FIGS. 19-21 are graphs depicting a relationship between tool mask per disc and tool mass for a number of example towable tools.

The towable tool disclosed herein may be preferably configured with optimized relationships between tool weight, width, and the number of discs carried by the tools. As illustrated in FIG. 19 and Table 1 below, the tools 100, 200, 300 exhibit a number of unexpected results wherein a preferred or optimized soil cultivating or tilling effect may be realized using only a single row of discs, using a plurality of ground-working discs consisting of four ground-working discs or consisting six ground-working discs, with an orientation such as described above in connection with the pluralities of ground-working discs 180, 280, 380.

One relationship is a substantially linear relationship between a ratio of the mass of the towable tool apparatus to a number of the plurality of ground-working discs equal to or greater than a minimum preferred value defined by the equation y=0.12x+16 wherein y is the ratio of the mass of the towable tool apparatus to a number of the plurality of ground-working discs and x is the mass of the towable tool apparatus. Another relationship is a substantially linear relationship between a ratio of a more preferred mass of the towable tool apparatus to a number of the plurality of ground-working discs is equal to or greater than a minimum value defined by the equation y=0.16x+18 wherein y is the ratio of the mass of the towable tool apparatus to a number of the plurality of ground-working discs and x is the mass of the towable tool apparatus. A further relationship is a substantially piecewise linear relationship between a ratio of a more preferred mass of the towable tool apparatus to a number of the plurality of ground-working discs is equal to or greater than a more preferred minimum value defined by the equation y=0.25x for x<=~350 kg and y=89 for x>~350 kg wherein y is the ratio of the mass of the towable tool apparatus to a number of the plurality of ground-working discs and x is the mass of the towable tool apparatus.

TABLE 1

| Tool | Tool kg | Max. kg/disc | Pref. kg/disc | Min. kg/disc |
| --- | --- | --- | --- | --- |
| 100 | 214.4 | 53.6 | 53.6 | 44.7 |
| 200 | 354 | 88.5 | 88.5 | 59.3 |
| 300 | 417.2 | 104.3 | 87.8 | 71.4 |

Figure 20:
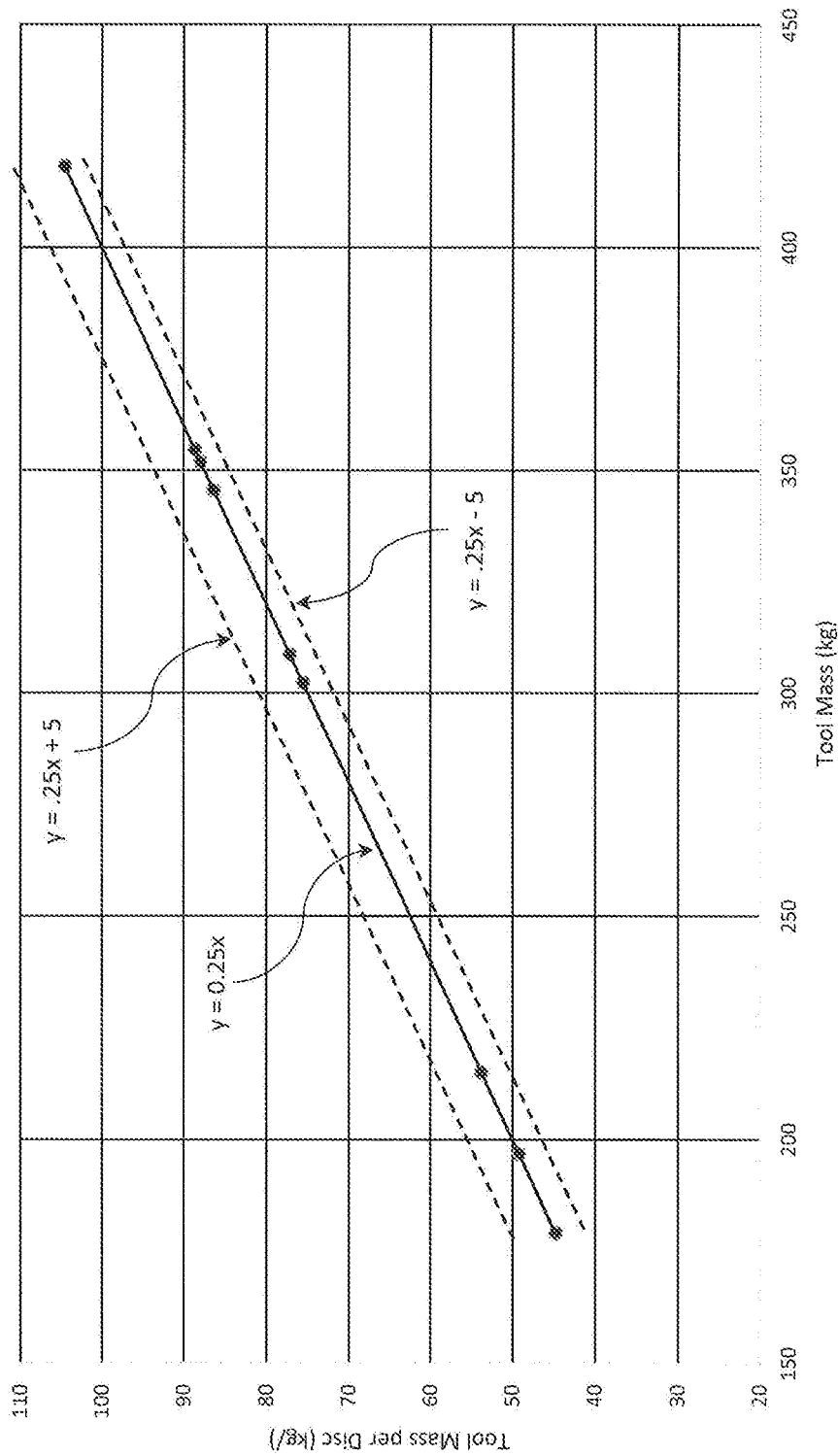
Figure 21:
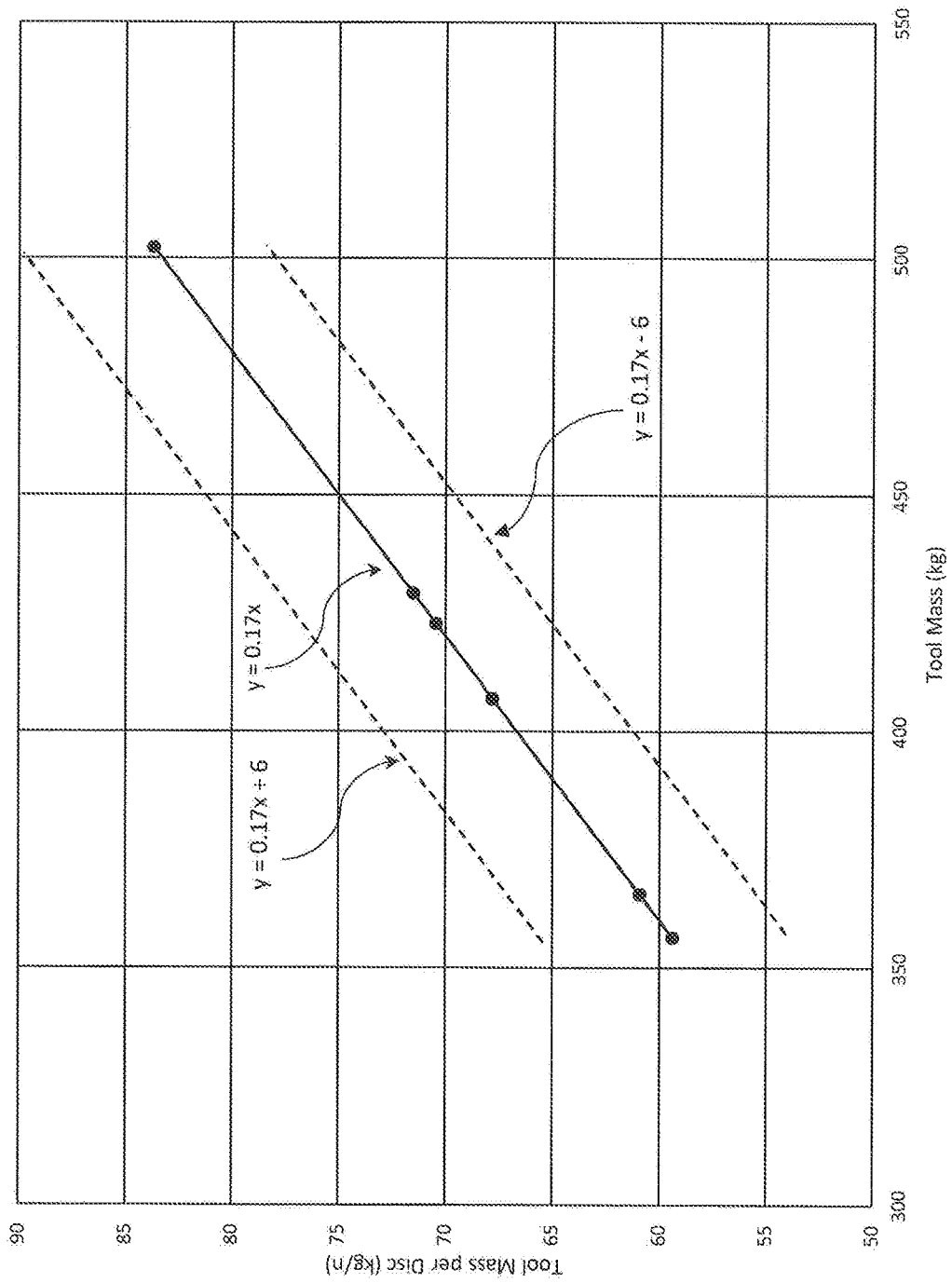

As illustrated in FIGS. 20-21 and Table 2 below, similar linear relationships as those noted above for tools 100, 200, 300 hold true for tools with mass variation 100A, 100B, and 100C (corresponding to tool 100 but with mass variation), 200A, 200B, 200C, 200D, 200E, 200F, 200G, and 200H (corresponding to tool 200 but with mass variation), 300A, 300B, 300C, and 300D (corresponding to tool 300 but with mass variation). Notwithstanding the variation in mass and the number of discs, such tools exhibit a number of unexpected results wherein a preferred or optimized soil cultivating or tilling effect may be realized using only a single row of discs, using a plurality of ground-working discs consisting of four ground-working discs, with an orientation such as described above in connection with the pluralities of ground-working discs 180, 280, 380.

One relationship for a tool with four discs is a substantially linear relationship between a ratio of the mass of the towable tool apparatus to a number of the plurality of ground-working discs equal to or greater than a minimum preferred value defined by the equation y=0.16x+18 wherein y is the ratio of the mass of the towable tool apparatus to a number of the plurality of ground-working discs and x is the mass of the towable tool apparatus. Another relationship is a substantially linear relationship between a ratio of the mass of the towable tool apparatus to a number of the plurality of ground-working discs equal to or greater than a minimum preferred value defined by the equation y=0.25x−5 and is equal to or less than a maximum value defined by the equation y=0.25x+5, wherein y is the ratio of the mass of the towable tool apparatus to a number of the plurality of ground-working discs and x is the mass of the towable tool apparatus.

One relationship for a tool apparatus with a mass of between 350 kg and 550 kg, the plurality of ground-working discs consists of six discs is a substantially linear relationship between a ratio of the mass of the towable tool apparatus to a number of the plurality of ground-working discs equal to or greater than a minimum preferred value defined by the equation y=0.17x−6 and is equal to or less than a maximum value defined by the equation y=0.17x+6, wherein y is the ratio of the mass of the towable tool apparatus to a number of the plurality of ground-working discs and x is the mass of the towable tool apparatus.

TABLE 2

| Tool | Weight (lbs.) | Mass (kg.) | # Discs | lbs./disc | kg/disc |
|---|---|---|---|---|---|
| 100A | 394 | 179 | 4 | 98.50 | 44.77 |
| 100B | 433 | 197 | 4 | 108.25 | 49.20 |
| 100C | 473 | 215 | 4 | 118.25 | 53.75 |
| 200A | 665 | 302 | 4 | 166.25 | 75.57 |
| 200B | 760 | 345 | 4 | 190.00 | 86.36 |
| 200C | 784 | 356 | 6 | 130.67 | 59.39 |
| 200D | 930 | 423 | 6 | 155.00 | 70.45 |
| 200E | 679 | 309 | 4 | 169.75 | 77.16 |
| 200F | 780 | 355 | 4 | 195.00 | 88.64 |
| 200G | 804 | 365 | 6 | 134.00 | 60.91 |
| 200H | 895 | 407 | 6 | 149.17 | 67.80 |
| 300A | 774 | 352 | 4 | 193.50 | 87.95 |
| 300B | 920 | 418 | 4 | 230.00 | 104.55 |
| 300C | 944 | 429 | 6 | 157.33 | 71.52 |
| 300D | 1105 | 502 | 6 | 184.17 | 83.71 |

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A towable tool apparatus comprising:
 a frame extending over a width in an X-axis direction, a length in a Y-axis direction, and a height in a z-axis direction;
 a plurality of support wheels rotatably coupled with the frame and configured to support the frame above an underlying ground surface in at least a first state of adjustment of the towable tool apparatus; and
 a plurality of ground-working discs each including a concave face surface extending radially outward from an axis of rotation and each being rotatably coupled with a respective rigid shank, each rigid shank being received in a respective receptacle of the frame and retained therein by a respective fastener such that each concave face surface of a first set of the ground-working discs is oriented in a first forward-facing direction offset from the Y-axis direction and each concave face surface of a second set of the ground-working discs is oriented in a second forward-facing direction offset from the Y-axis direction, the first forward-facing direction being different than the second forward-facing direction;
 wherein the plurality of ground-working discs are arranged in a row extending along the X axis direction, are substantially coextensive in the Y-axis direction, and extend in the Y-axis direction to overlap entirely with the extent of the ground-contacting support wheels in the Y-axis direction.

2. The towable tool apparatus of claim 1, wherein the respective fastener is manually engagable by an operator without use of a tool to prevent removal of the respective shank from the respective receptacle and manually disengageable by an operator without the use of a tool to permit removal of the respective shank from the respective receptacle.

3. The towable tool apparatus of claim 1, wherein the plurality of ground-working discs are arranged in a single row with each axis of rotation intersecting a line parallel to the X-axis direction, the single row consisting of all of the ground-working discs of the towable tool apparatus.

4. The towable tool apparatus of claim 1, wherein each of the plurality of ground-working discs is spaced apart from each neighboring one of the plurality of ground-working discs at a distance equal to 1.4 times a radius of each disc.

5. The towable tool apparatus of claim 4, wherein said distance is measured from a point of intersection of a midpoint of an axis of rotation and a line extending in the X-axis direction of each of the ground-working disc and said point of intersection of each adjacent ground-working disc.

6. The towable tool apparatus of claim 4, wherein said distance is greater than or equal to 2 times the radius of each ground-working disc.

7. The towable tool apparatus of claim 1, wherein the plurality of ground-working discs are disposed at an angle relative to the Y-axis direction of 20 degrees+/−10%.

8. The towable tool apparatus of claim 1, wherein the number of the plurality of ground-working discs comprises an even number between four and eight.

9. The towable tool apparatus of claim 1, wherein each of the plurality of ground-working discs is spaced apart from each neighboring one of the plurality of ground-working discs at a distance of 10 inches or more.

10. The towable tool apparatus of claim 1 wherein a ratio of the mass of the towable tool apparatus to a number of the plurality of ground-working discs is equal to or greater than a minimum value defined by the equation $y=0.12x+16$ wherein y is the ratio of the mass of the towable tool apparatus to a number of the plurality of ground-working discs and x is the mass of the towable tool apparatus.

11. The towable tool apparatus of claim 1 wherein a ratio of the mass of the towable tool apparatus to a number of the plurality of ground-working discs is equal to or greater than a minimum value defined by the equation $y=0.16x+18$ wherein y is the ratio of the mass of the towable tool apparatus to a number of the plurality of ground-working discs and x is the mass of the towable tool apparatus.

12. The towable tool apparatus of claim 11, wherein a ratio of the mass of the towable tool apparatus to a number of the plurality of ground-working discs is equal to or greater than a minimum value defined by the equation $y=0.25x-5$ and is equal to or less than a maximum value defined by the equation $y=0.25x+5$, wherein y is the ratio of the mass of the towable tool apparatus to a number of the plurality of ground-working discs and x is the mass of the towable tool apparatus.

13. The towable tool apparatus of claim 1, wherein the towable tool apparatus has a mass of between 350 kg and 550 kg, the plurality of ground-working discs consists of six discs.

14. The towable tool apparatus of claim 13, wherein a ratio of the mass of the towable tool apparatus to a number of the plurality of ground-working discs is equal to or greater than a minimum value defined by the equation $y=0.17x-6$ and is equal to or less than a maximum value defined by the equation $y=0.17x+6$, wherein y is the ratio of the mass of the towable tool apparatus to a number of the plurality of ground-working discs and x is the mass of the towable tool apparatus.

15. A towable tool apparatus comprising:
a frame extending over a width in an X-axis direction, a length in a Y-axis direction, and a height in a z-axis direction;
a plurality of support wheels rotatably coupled with the frame and configured to support the frame above an underlying ground surface in at least a first state of adjustment of the towable tool apparatus; and
a plurality of ground-working discs each including a concave face surface extending radially outward from an axis of rotation and each being rotatably coupled with a respective rigid shank, each rigid shank being received in a respective receptacle of the frame and retained therein by a respective fastener such that each concave face surface of a first set of the ground-working discs is oriented in a first forward-facing direction offset from the Y-axis direction and each concave face surface of a second set of the ground-working discs is oriented in a second forward-facing direction offset from the Y-axis direction, the first forward-facing direction being different than the second forward-facing direction;
wherein a ratio of the mass of the towable tool apparatus to a number of the plurality of ground-working discs is equal to or greater than a minimum value defined by the equation $y=0.12x+16$ wherein y is the ratio of the mass of the towable tool apparatus to a number of the plurality of ground-working discs and x is the mass of the towable tool apparatus.

16. The towable tool apparatus of claim 15 wherein a ratio of the mass of the towable tool apparatus to a number of the plurality of ground-working discs is equal to or greater than a minimum value defined by the equation $y=0.16x+18$ wherein y is the ratio of the mass of the towable tool apparatus to a number of the plurality of ground-working discs and x is the mass of the towable tool apparatus.

17. The towable tool apparatus of claim 16, wherein a ratio of the mass of the towable tool apparatus to a number of the plurality of ground-working discs is equal to or greater than a minimum value defined by the equation $y=0.25x-5$ and is equal to or less than a maximum value defined by the equation $y=0.25x+5$, wherein y is the ratio of the mass of the towable tool apparatus to a number of the plurality of ground-working discs and x is the mass of the towable tool apparatus.

18. A towable tool apparatus comprising:
a frame extending over a width in an X-axis direction, a length in a Y-axis direction, and a height in a z-axis direction;
a plurality of support wheels rotatably coupled with the frame and configured to support the frame above an underlying ground surface in at least a first state of adjustment of the towable tool apparatus; and
a plurality of ground-working discs each including a concave face surface extending radially outward from an axis of rotation and each being rotatably coupled with a respective rigid shank, each rigid shank being received in a respective receptacle of the frame and retained therein by a respective fastener such that each concave face surface of a first set of the ground-working discs is oriented in a first forward-facing direction offset from the Y-axis direction and each concave face surface of a second set of the ground-working discs is oriented in a second forward-facing direction offset from the Y-axis direction, the first forward-facing direction being different than the second forward-facing direction;
wherein the towable tool apparatus has a mass of between 350 kg and 550 kg, the plurality of ground-working discs consists of six discs.

19. The towable tool apparatus of claim 18, wherein a ratio of the mass of the towable tool apparatus to a number of the plurality of ground-working discs is equal to or greater than a minimum value defined by the equation $y=0.17x-6$ and is equal to or less than a maximum value defined by the equation $y=0.17x+6$, wherein y is the ratio of the mass of the towable tool apparatus to a number of the plurality of ground-working discs and x is the mass of the towable tool apparatus.

* * * * *